United States Patent
Wakai et al.

(10) Patent No.: US 10,812,691 B2
(45) Date of Patent: Oct. 20, 2020

(54) IMAGE CAPTURING APPARATUS AND IMAGE CAPTURING METHOD

(71) Applicant: Panasonic Intellectual Property Management Co., Ltd., Osaka (JP)

(72) Inventors: Nobuhiko Wakai, Tokyo (JP); Takeo Azuma, Kyoto (JP); Kunio Nobori, Tokyo (JP); Satoshi Sato, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/374,641

(22) Filed: Apr. 3, 2019

(65) Prior Publication Data

US 2019/0230264 A1 Jul. 25, 2019

Related U.S. Application Data

(63) Continuation of application No. PCT/JP2017/042484, filed on Nov. 28, 2017.

(30) Foreign Application Priority Data

Dec. 15, 2016 (JP) .................. 2016-243850

(51) Int. Cl.
*H04N 5/225* (2006.01)
*H04N 13/204* (2018.01)
(Continued)

(52) U.S. Cl.
CPC ........... *H04N 5/2254* (2013.01); *G03B 15/00* (2013.01); *G03B 19/07* (2013.01); *G03B 37/00* (2013.01);
(Continued)

(58) Field of Classification Search
CPC .... H04N 5/2254; H04N 5/232; H04N 5/2258; H04N 13/128; H04N 5/22541;
(Continued)

(56) References Cited

U.S. PATENT DOCUMENTS

2007/0177004 A1* 8/2007 Kolehmainen .... H04N 5/23232
348/42
2009/0225432 A1 9/2009 Toyoda et al.
(Continued)

FOREIGN PATENT DOCUMENTS

CN 205545576 8/2016
JP 2009-211012 9/2009
(Continued)

OTHER PUBLICATIONS

Drazic et al, Optimal depth resolution in plenoptic imaging (Year: 2010).*

(Continued)

*Primary Examiner* — Shan E Elahi
(74) *Attorney, Agent, or Firm* — Wenderoth, Lind & Ponack, L.L.P.

(57) ABSTRACT

An image capturing apparatus includes a first camera that captures a first image, a second camera that captures a second image, a lens cover that includes transparent parts and ridgelines and that covers the first camera and the second camera, and a processing circuit that identifies a pixel located in an area, in which it is necessary to interpolate a pixel value, in the first image, and generates an output image using the first image and interpolation pixel information for interpolating a pixel value of the identified pixel. Each ridgeline between adjacent parts of the lens cover is twisted with respect to a base line extending between a center of a first lens of the first camera and a center of a second lens of the second camera. An upper part of the lens cover opposes a base on which the first camera and the second camera are disposed.

14 Claims, 27 Drawing Sheets

(51) Int. Cl.
*H04N 13/128* (2018.01)
*H04N 5/232* (2006.01)
*G03B 37/00* (2006.01)
*G03B 19/07* (2006.01)
*G03B 15/00* (2006.01)
*H04N 13/00* (2018.01)

(52) U.S. Cl.
CPC ....... *H04N 5/2258* (2013.01); *H04N 5/22541* (2018.08); *H04N 5/232* (2013.01); *H04N 13/128* (2018.05); *H04N 13/204* (2018.05); *H04N 2013/0081* (2013.01)

(58) Field of Classification Search
CPC ......... H04N 13/204; H04N 2013/0081; H04N 13/239; H04N 13/243; G03B 15/00; G03B 19/07; G03B 37/00
USPC .......................................................... 348/47
See application file for complete search history.

(56) References Cited

U.S. PATENT DOCUMENTS

| | | | |
|---|---|---|---|
| 2012/0147224 A1* | 6/2012 | Takayama | H04N 5/349 348/241 |
| 2012/0243093 A1 | 9/2012 | Tonar et al. | |
| 2013/0135439 A1* | 5/2013 | Kakuko | H04N 13/00 348/46 |
| 2015/0319409 A1 | 11/2015 | Imamura et al. | |

FOREIGN PATENT DOCUMENTS

| | | |
|---|---|---|
| JP | 2009-223526 | 10/2009 |
| JP | 2011-250138 | 12/2011 |
| JP | 2015-222423 | 12/2015 |

OTHER PUBLICATIONS

Muraoka et al, Perception of pseudo-stereoscopic image depths of three-dimensional objects displayed on VDT screen (Year: 2007).*

Extended European Search Report dated Dec. 3, 2019 in corresponding European Patent Application No. 17882027.0.

International Search Report of PCT application No. PCT/JP2017/042484 dated Feb. 6, 2018.

Tatsuya Naruse et al., "3D Measurement of Objects in Water Using Fish-eye Stereo Camera", the Japan Society for Precision Engineering, 79(4), Apr. 2013, pp. 344-348.

Roger Y. Tsai, "A Versatile Camera Calibration Technique for High-Accuracy 3D Machine Vision Metrology Using Off-The-Shelf TV Cameras and Lenses", IEEE Journal of Robotics and Automation, vol. RA-3, No. 4, Aug. 4, 1987, pp. 323-344.

* cited by examiner

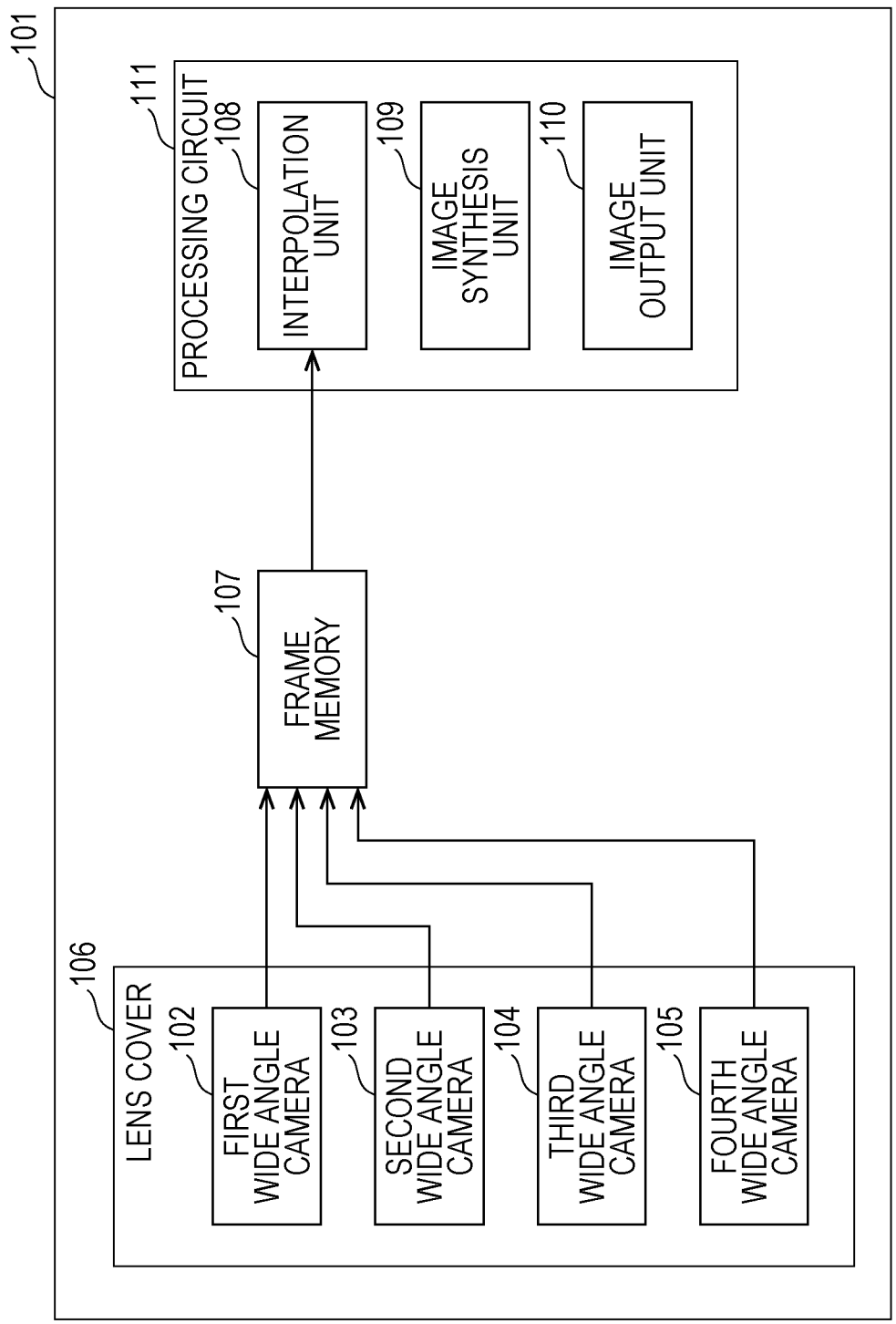

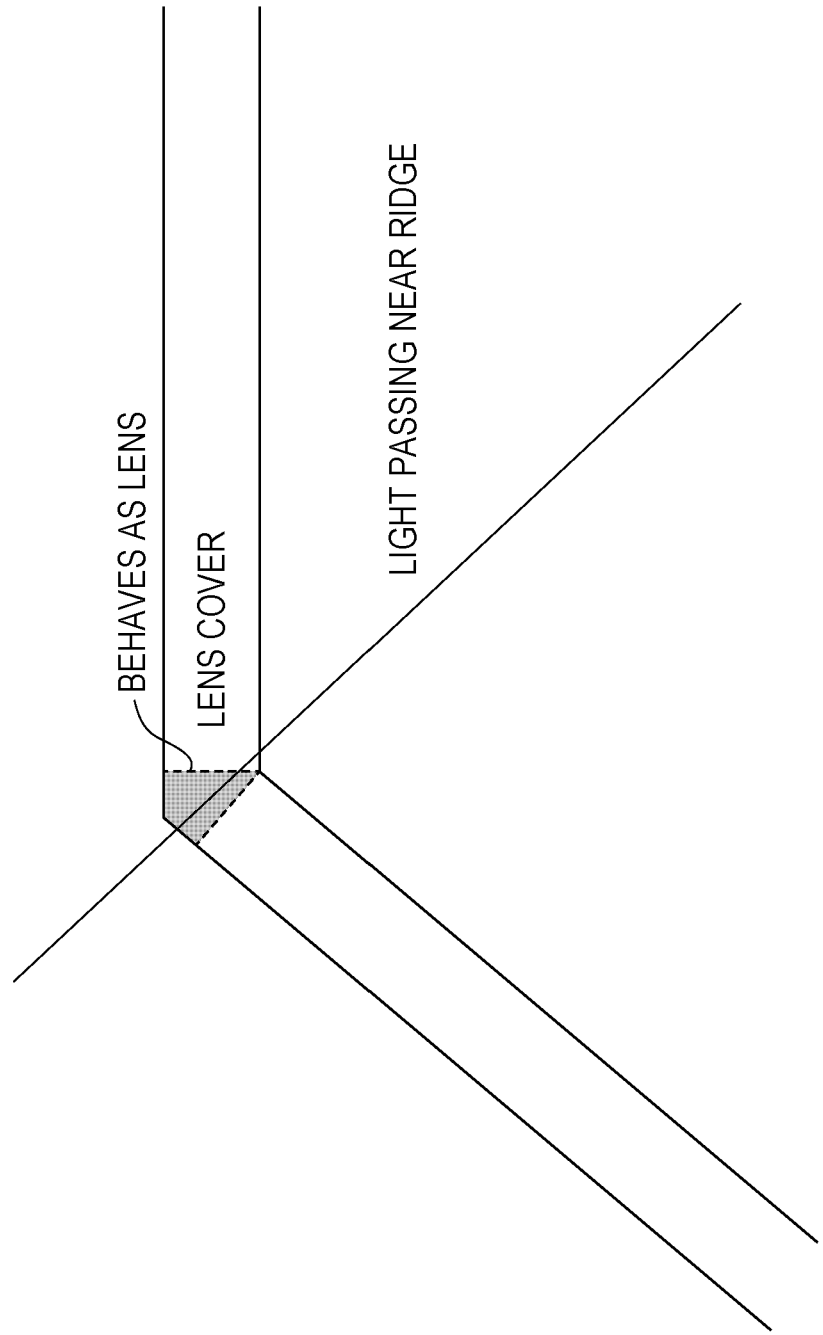

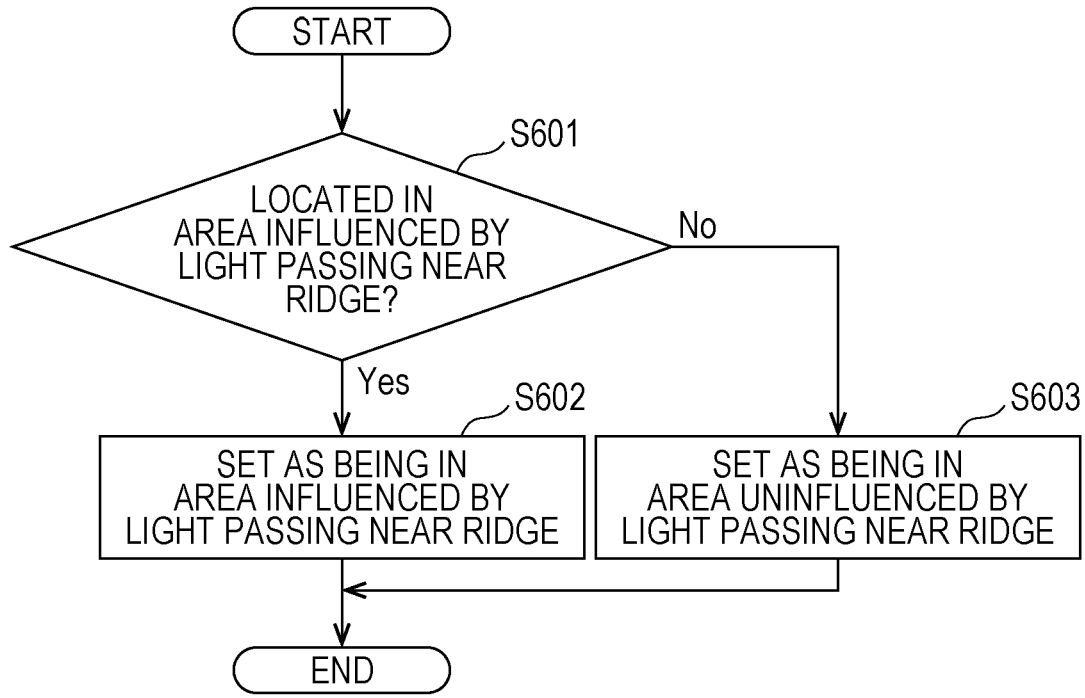
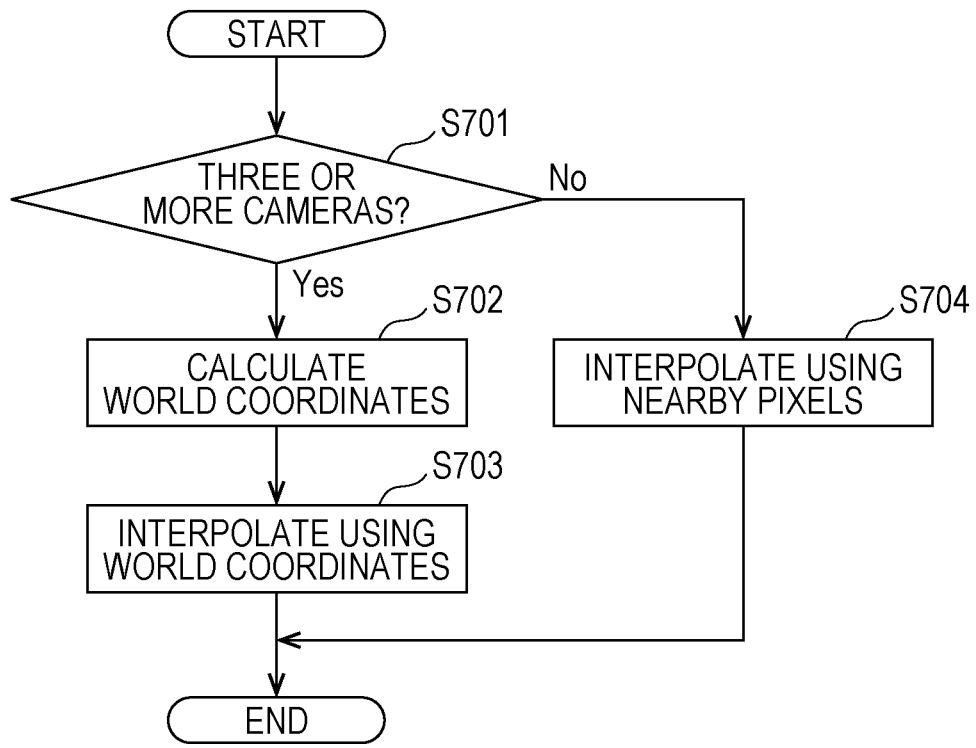

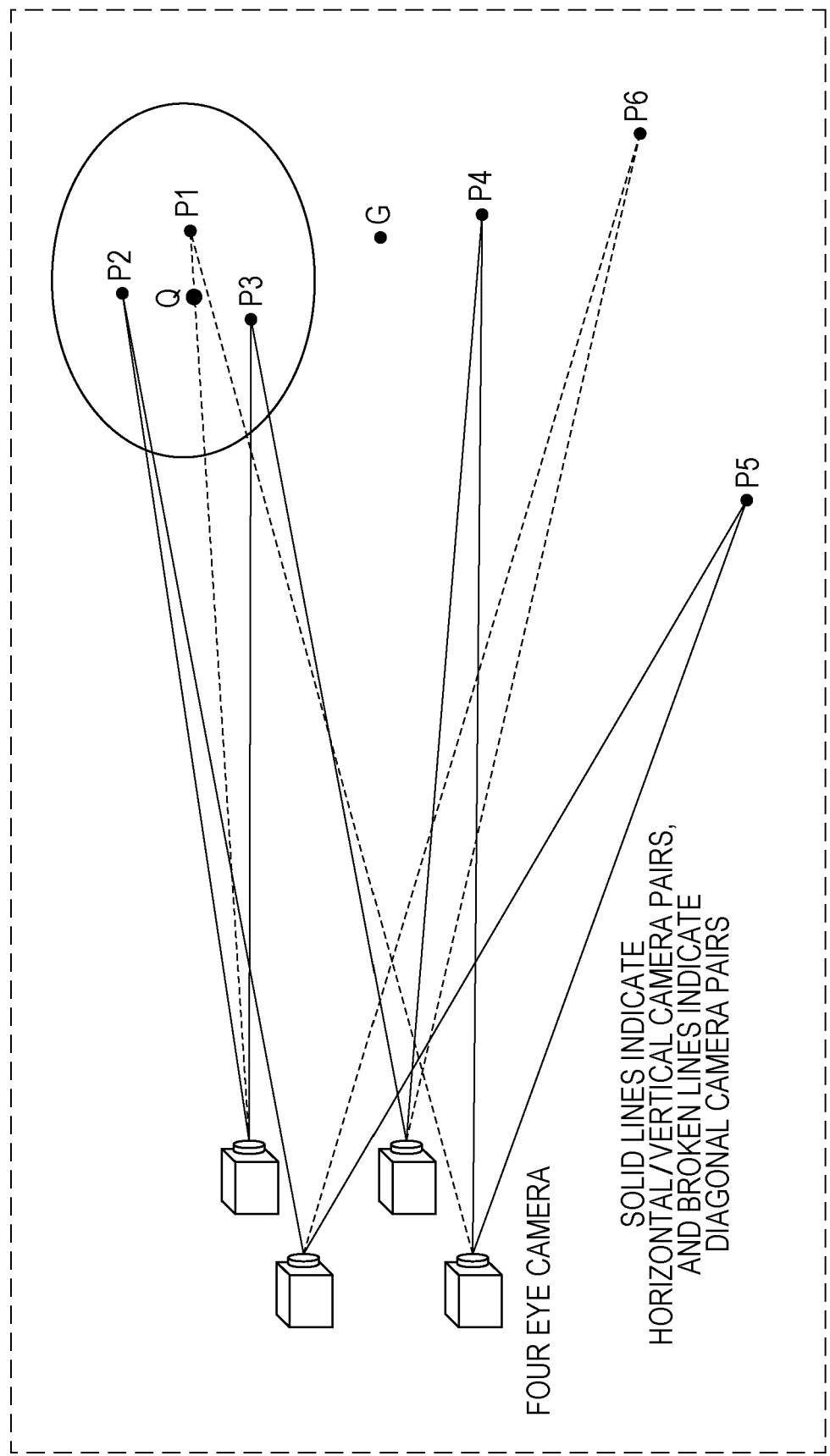

PLAN VIEW

SIDE VIEW

PLAN VIEW

SIDE VIEW

PLAN VIEW

SIDE VIEW

PLAN VIEW

SIDE VIEW

PLAN VIEW

SIDE VIEW

VALUES OF CONTOUR LINES INDICATE EVALUATED VALUES J

IMAGE CAPTURING APPARATUS AND IMAGE CAPTURING METHOD

BACKGROUND

1. Technical Field

The present disclosure relates to an image capturing technique using a camera.

2. Description of the Related Art

In stereoscopic distance measurement, an image capturing apparatus of a light-field camera, or the like, calculation of a depth distance of an object, synthesizing of an image as seen from a virtual viewpoint, or the like is performed using images captured at different points of view. In a case where such a compound-eye image capturing apparatus is used for a long term in an outdoor environment, a lens cover is used to protect lenses (see, for example, Japanese Unexamined Patent Application Publication No. 2015-222423, Japanese Unexamined Patent Application Publication No. 2009-211012, and Japanese Unexamined Patent Application Publication No. 2009-223526)

In general, in a case where the distance between lenses is large, a lens cover is used individually for each lens. In a case where the distance between lenses is small, one lens cover is used for the lenses. Thus, in a small-size image capturing apparatus, it is preferable to use a single camera module and a single lens cover for a compound-eye, that is, lenses.

SUMMARY

In a case where lenses are disposed within a single lens cover, in order to reduce the size of the lens cover, the lens cover may be formed such that its external shape includes a ridgeline.

However, in the case where a lens cover having a ridgeline is used, light passing near the ridgeline is distorted, which causes a captured image to include an area in which passed light does not focus correctly.

One non-limiting and exemplary embodiment provides an image capturing apparatus and an image capturing method capable of reducing an influence of distortion of light passing near a ridgeline of a lens cover on a captured image compared with the conventional image capturing apparatus.

In one general aspect, the techniques disclosed here feature an image capturing apparatus including a first camera that captures a first image, a second camera that captures a second image, a lens cover that includes parts transparent to light and ridgelines and that covers the first camera and the second camera, the parts including an upper part and adjacent parts, each of the adjacent parts being adjacent to the upper part, the ridgelines being formed between surfaces of the respective adjacent parts and a surface of the upper part, the image capturing apparatus further including a processing circuit that (i) identifies a pixel located in an area, in which it is necessary to interpolate a pixel value, in the first image, and (ii) generates an output image using the first image and interpolation pixel information for interpolating the pixel value of the identified pixel, each of the ridgelines being at a location twisted with respect to a base line extending between a first center of a first lens of the first camera and a second center of a second lens of the second camera, the upper part opposing a base on which the first camera and the second camera are disposed, the processing circuit identifying the pixel based on the first image and the second image.

The present disclosure makes it possible to more reduce the influence by ridgelines the lens cover than is possible by the conventional image capturing apparatus.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 1 is a block diagram illustrating a configuration of an image capturing apparatus according to Embodiment 1;

FIG. 3 is a diagram illustrating a part of a cross section of a lens cover;

FIG. 6 is a flowchart illustrating a second determination process;

FIG. 7 is a flowchart illustrating a process in an interpolation step;

FIG. 8 is a schematic diagram illustrating a world coordinate calculation performed by a four-eye system;

DETAILED DESCRIPTION

Figure 2A:
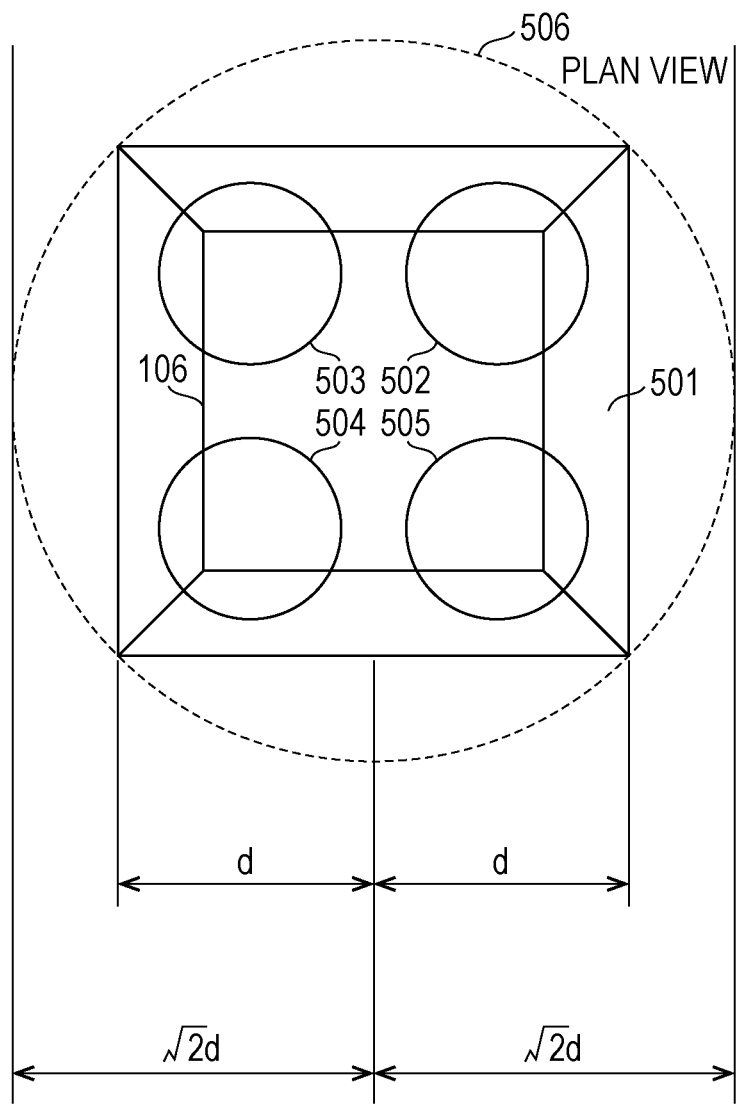
FIG. 2A is a plan view illustrating a positional relationship between a wide-angle camera and a lens cover.

Underlying Knowledge Forming Basis of the Present Disclosure

The present inventors have found that problems described below may occur in the conventional image capturing apparatus or the like described above.

In a moving object such as a drone or a vehicle, a stereo camera is used for monitoring surroundings or for drive assist. For such purposes, it is preferable to use a wide-angle compound-eye camera. In a case where an image capturing system is used in a moving object, a restriction is imposed on the image capturing system in terms of an installation position, a size, and a weight. Regarding the installation position, it is preferable to select a location close to a moving object surface to ensure a large field of view. Regarding the size, it is preferable that the lens cover is small in thickness to prevent a collision and the size is small enough to be installed in a limited installation space. Regarding the weight, a small weight is preferable in particular for use in a flying object such as a drone. When an image capturing system includes two or more independent wide-angle cameras, it is difficult to meet the restrictions described above.

In view of the above, the present inventors have achieved an idea of a lens cover that makes it possible to realize a small-size compound-eye image capturing apparatus disposed in a single housing and an idea of an image capturing apparatus using such a lens cover.

To handle the above-described situations, an aspect of the present disclosure provides an image capturing apparatus including a first camera that captures a first image, a second camera that captures a second image, a lens cover that includes parts transparent to light and ridgelines and that covers the first camera and the second camera, the parts including an upper part and adjacent parts, each of the adjacent parts being adjacent to the upper part, the ridgelines being formed between surfaces of the respective adjacent parts and a surface of the upper part, and a processing circuit that (i) identifies a pixel located in an area, in which it is necessary to interpolate a pixel value, in the first image, and (ii) generates an output image using the first image and interpolation pixel information for interpolating the pixel value of the identified pixel, each of the ridgelines being at a location twisted with respect to a base line extending between a first center of a first lens of the first camera and a second center of a second lens of the second camera, the upper part opposing a base on which the first camera and the second camera are disposed.

Thus, the image capturing apparatus described above makes it possible to more reduce the influence by a region near a ridgeline of the lens cover than is possible by the conventional image capturing apparatus.

Furthermore, for example, the processing circuit may identify the pixel based on the first image and the second image.

This makes it possible for the image capturing apparatus to identify a pixel in an area influenced by distortion of light passing near a ridgeline based on an image captured by this image capturing apparatus even in a case where it is not determined which pixel is a pixel in an area influenced by distortion of light passing near a ridgeline.

For example, the image capturing apparatus may further include a storage unit that stores area identification information for identifying the area, and the processing circuit may identify the pixel based on the area identification information.

This makes it possible for this image capturing apparatus to identify a pixel in an area influenced by distortion of light passing near a ridgeline without using an image captured by this image capturing apparatus.

For example, the processing circuit may further acquire, as the interpolation pixel information, a pixel value of a neighboring pixel located within a predetermined range of a distance from the area.

This makes it possible for this image capturing apparatus to generate an output image from the first image.

For example, the image capturing apparatus may further include a third camera that captures a third image, and the processing circuit may acquire, as the interpolation pixel information, information on a pixel value of a pixel corresponding to the area by using the second image and the third image.

This makes it possible for this image capturing apparatus to generate an output image in which interpolation is performed with higher accuracy for a pixel in an area influenced by distortion of light passing near a ridgeline.

For example, the lens cover may further cover the upper surface of the base and may be included within a sphere with a radius equal to a radius of a circle circumscribed about the upper surface.

This makes it possible for this image capturing apparatus to have a less probability of coming into contact with an external object because of a relatively low height of the lens cover.

Furthermore, for example, one of the ridgelines and a neighboring region thereof may be replaced by a curved surface.

This makes it possible for this image capturing apparatus to achieve improved safety of the lens cover.

For example, the lens cover may further cover the upper surface of the base, and the outer surface of the upper part, the inner surface of the upper part, and the upper surface may be parallel to each other.

This makes it possible for this image capturing apparatus to allow light passing perpendicularly through the outer surface of the upper part of the lens cover to be incident perpendicularly to the upper surface of the base.

For example, the lens cover may further cover the upper surface of the base, and the outer surface of the upper part and the upper surface may be similar in shape to each other and the outer surface of the upper part may be smaller than the upper surface.

This makes it possible for this image capturing apparatus to suppress an increase in the number of ridgelines.

According to an aspect, the present disclosure provides an image capturing apparatus including a first camera that captures a first image, a second camera that captures a second image, a lens cover that includes parts transparent to light and ridgelines and that covers the first camera and the second camera, the parts including an upper part and adjacent parts, each of the adjacent parts being adjacent to the upper part, the ridgelines being formed between surfaces of the respective adjacent parts and a surface of the upper part, and a processing circuit that (i) identifies a pixel located in an area, in which it is necessary to interpolate a pixel value, in the first image, and (ii) generates an output image using the first image and interpolation pixel information for interpolating the pixel value of the identified pixel, an external shape of the lens cover being formed such that when N denotes the number of cameras, S denotes a field of view, i denotes an index indicating the first camera or the second camera, $$\vec{m}_i$$

denotes a unit line-of-sight vector of a camera i, $$\vec{n}$$

denotes a unit normal vector of the cover at a point through which the line-of-sight vector of the camera i passes, and $$J = \frac{1}{NS}\sum_{i=1}^{N} \int_S (\vec{n} \cdot \vec{m}_i) dS$$

defines an evaluation value J, the evaluation value J is greater than 0.7. Thus, the image capturing apparatus described above makes it possible to more reduce the influence by a region near a ridgeline of the lens cover than is possible by the conventional image capturing apparatus.

According to an aspect, the present disclosure provides an image capturing apparatus including a first camera that captures a first image, a second camera that captures a second image, a lens cover that includes parts transparent to light and ridgelines and that covers the first camera and the second camera, the parts including an upper part and adjacent parts, the ridgelines being formed between surfaces of the respective adjacent parts and a surface of the upper part, and each of the ridgelines being at a location twisted with respect to a base line extending between a first center of a first lens of the first camera and a second center of a second lens of the second camera.

This makes it possible to more reduce the influence by a region near a ridgeline of the lens cover than is possible by the conventional image capturing apparatus.

According to an aspect, the present disclosure provides an image capturing method including controlling a first camera to capture a first image, controlling a second camera to capture a second image, the first camera and the second camera being covered with a lens cover including parts transparent to light and ridgelines, the parts including an upper part and adjacent parts, each of the adjacent parts being adjacent to the upper part, the ridgelines being formed between surfaces of the respective adjacent parts and a surface of the upper part, and (i) identifying a pixel located in an area, in which it is necessary to interpolate a pixel value, in the first image, and (ii) generates an output image using the first image and interpolation pixel information for interpolating the pixel value of the identified pixel, each of the ridgelines being at a location twisted with respect to a base line extending between a first center of a first lens of the first camera and a second center of a second lens of the second camera, the upper part opposing a base on which the first camera and the second camera are disposed.

This makes it possible to more reduce the influence by a region near a ridgeline of the lens cover than is possible by the conventional image capturing apparatus.

Embodiments of the present disclosure are described below with reference to drawings. Note that any embodiment described below is provided to illustrate a specific preferable example according to the present disclosure. In the following embodiments of the present disclosure, values, shapes, materials, constituent elements, locations of elements, manners of connecting elements, steps, the order of steps, and the like are described by way of example but not limitation. Among constituent elements described in the following embodiments, those constituent elements that are not described in independent claims indicating highest-level concepts of the present disclosure are optional.

Note that each drawing is a schematic diagram, which does not necessarily provide a strict description. Throughout all figures, substantially the same elements are denoted by same reference signs and duplicated descriptions are omitted or simplified.

EMBODIMENT 1

Frustum Shape

According to Embodiment 1, an image capturing apparatus includes lenses of four wide-angle cameras disposed on a base having a square upper surface. The center of the upper surface of the base is at an intersection point of diagonals of the square. In a case where each of the lenses of the respective four wide-angle cameras has a shape of a hemisphere, each of the lenses of the four wide-angle cameras intersects with the upper surface of the base where a circle is formed at the intersection. In a case where the center of this circle is defined as the center of the lens of the wide-angle camera, the four lenses are disposed on the upper surface of the base such that the center of the four centers of the four lenses of the four wide-angle cameras is coincident with the center of the upper surface of the base and such that the four lenses are symmetrical about the center of the upper surface of the base.

A camera module may include the base and four image sensing devices disposed on the upper surface of the base.

The four image sensing devices correspond to the respective four wide-angle cameras. Each wide-angle camera may include a wide-angle camera lens corresponding to a corresponding image sensing device.

The image capturing apparatus according to the present disclosure may include two or more wide-angle cameras, and the content of the present disclosure may be applied to the two or more wide-angle cameras.

It is assumed that the cameras have been subjected to camera calibration, and camera parameters are known. As for the camera parameters, camera parameters based on a camera model of a pinhole camera (equation (1)) may be employed, or the camera parameters may be calculated using a known method such as a Tsai method (see, for example, Roger Y. Tsai, A versatile camera calibration technique for high-accuracy 3D machine vision metrology using off-the-shelf TV cameras and lenses. IEEE Journal of Robotics and Automation. Vol. 3, pp. 323-344, 1987).

$$h \begin{bmatrix} x \\ y \\ 1 \end{bmatrix} = \begin{bmatrix} 1/d'x & 0 & C_x \\ 0 & 1/d'y & C_y \\ 0 & 0 & 1 \end{bmatrix} \begin{bmatrix} f & 0 & 0 & 0 \\ 0 & f & 0 & 0 \\ 0 & 0 & 1 & 0 \end{bmatrix} \begin{bmatrix} R_{11} & R_{12} & R_{13} & T_x \\ R_{21} & R_2 & R_{23} & T_y \\ R_{31} & R_{32} & R_{33} & T_z \\ 0 & 0 & 0 & 1 \end{bmatrix} \begin{bmatrix} X \\ Y \\ Z \\ 1 \end{bmatrix} \quad (1)$$

In equation (1), an x component and a y component of an image center are denoted by Cx and Cy, a focal length is denoted by f, lengths in the x and y directions of one pixel of the image sensing device are respectively denoted by d'x and d'y, a 3×3 rotation matrix with respect to a camera world coordinate system is denoted by R (the digit in the ten's place of a subscript indicates a row and the digit in the one's place indicates a column), x, y, and z components of translation with respect to the camera coordinate system are respectively denoted by Tx, Ty, and Tz, and h is a parameter with no degree of freedom.

FIG. 1 is a block diagram illustrating a configuration of an image capturing apparatus 101 according to Embodiment 1.

As shown in FIG. 1, the image capturing apparatus 101 includes a first wide-angle camera 102, a second wide-angle camera 103, a third wide-angle camera 104, a fourth wide-angle camera 105, a lens cover 106, a frame memory 107, and a processing circuit 111. Each of the first wide-angle camera 102 to the fourth wide-angle camera 105 has a viewing angle of, by way of example, 110° or greater. Note that the wide-angle camera may also be referred to, simply, as a camera.

These constituent elements are described further below.

The first wide-angle camera 102 captures a first image. The second wide-angle camera 103 captures a second image. The third wide-angle camera 104 captures a third image. The fourth wide-angle camera 105 captures a fourth image.

The first wide-angle camera 102 to the fourth wide-angle camera 105 are disposed on the upper surface of a base such that fields of view of the wide-angle cameras overlap each other. For example, the field of view of the first wide-angle camera overlaps the field of view of the second wide-angle camera, the field of view of the first wide-angle camera overlaps the field of view of the third wide-angle camera, the field of view of the first wide-angle camera overlaps the field of view of the fourth wide-angle camera, the field of view of the second wide-angle camera overlaps the field of view of the third wide-angle camera, the field of view of the second wide-angle camera overlaps the field of view of the fourth wide-angle camera, and the field of view of the third wide-angle camera overlaps the field of view of the fourth wide-angle camera.

The lens cover 106 includes parts transparent to light, and covers the first wide-angle camera 102 to the fourth wide-angle camera 105. Each of the parts includes an outer surface and an inner surface parallel to the outer surface. The outer surface receives light from an object, and the light is output from the inner surface. More specifically, the lens cover 106 completely covers the upper surface of the base on which the first wide-angle camera 102 to the fourth wide-angle camera 105 are disposed such that the upper surface of the base is within a solid angle of $2\pi$ rad. The lens cover 106 is made of, by way of example, transparent plastic.

Figure 2B:
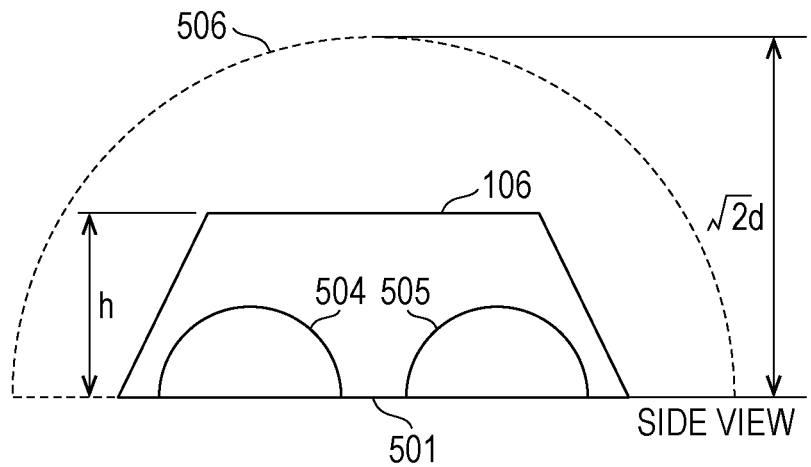
FIG. 2B is a side view illustrating a positional relationship between a wide-angle camera and a lens cover.

FIG. 2A and FIG. 2B are diagrams illustrating a positional relationship between wide-angle cameras and the lens cover.

In FIG. 2A and FIG. 2B, 501 denotes the base, 502 to 505 respectively denote lenses of the first wide-angle camera 102 to the fourth wide-angle camera 105, 106 denotes the lens cover, and 506 denotes a virtual hemisphere face circumscribed about the base 501. The thickness of the base 501 may be regarded as infinitely small.

As shown in FIG. 2A and FIG. 2B, the lens cover 106 includes one upper part and four sides. The lens cover 106 has a shape of a frustum including a bottom face given by the upper surface of the square base 501 and also including one upper part and four sides. Note that h is the height of the lens cover 106, and d is one-half the length of one side of the base. Furthermore, $$\sqrt{2}d$$

denotes a radius of a virtual hemisphere face circumscribed about the base.

Thus, the bottom surface size of the lens cover 106 can be smaller by a factor of $$1/\sqrt{2}$$

than the bottom surface of the virtual hemisphere face 506 circumscribed about the base.

Now, a behavior of light passing through near a ridgeline of the lens cover 106 is described below with reference to drawings. The lens cover 106 includes parts including four side parts and one upper part. Each two adjacent parts of the parts have a ridgeline. The lens cover 106 has eight ridgelines.

FIG. 3 is a diagram partially illustrating a cross section of the lens cover 106.

As shown in FIG. 3, a region near a ridgeline can be regarded approximately as a lens having a shape of quadrilateral, in cross section, including two sides each having a length equal to the thickness of the plate of the lens cover. The presence of such a ridgeline region causes the light passing near the ridgeline to be distorted. As a result, corresponding to the region near the ridgeline, a captured image has an area in which passed light does not correctly focus and thus blurring occurs (hereinafter such an area will be referred to as an "area influenced by distortion of light passing near a ridgeline").

Referring again to FIG. 1, the configuration of the image capturing apparatus 101 is further described.

The frame memory 107 stores images captured by the first wide-angle camera 102 to the fourth wide-angle camera 105.

The processing circuit 111 identifies, in the first image, a pixel located in an area influenced by distortion of light passing near a ridgeline between two adjacent parts of the parts of the lens cover 106, and the processing circuit 111 generates an output image using the first image and interpolation pixel information for interpolating a pixel value of the identified pixel. The processing circuit 111 may be realized, by way of example, by executing a program stored in a memory (not illustrated) by a processor (not illustrated) or may be realized using a dedicated hardware circuit such as an ASIC (Application Specific Integrated Circuit) or the like.

The processing circuit 111 includes an interpolation unit 108, an image synthesis unit 109, and an image output unit 110. The interpolation unit 108 interpolates a pixel value of a pixel included in an area influenced by distortion of light passing near a ridgeline.

The interpolation performed by the interpolation unit 108 is described below with reference to drawings.

Figure 4:
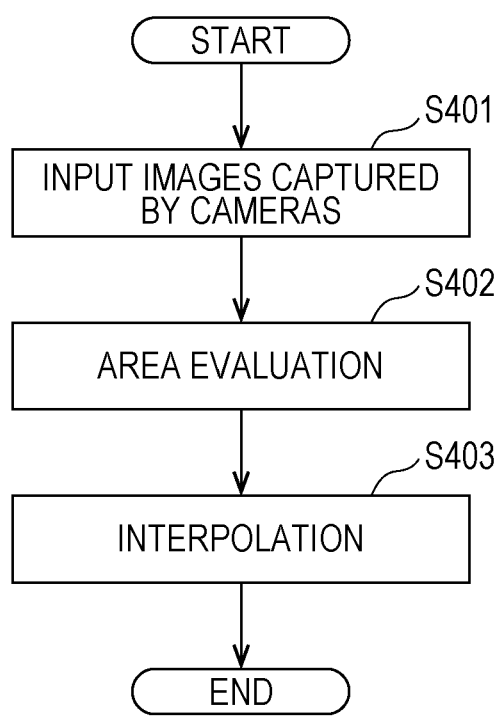
FIG. 4 is a flowchart illustrating an operation of an interpolation unit.

FIG. 4 is a flowchart illustrating an operation of the interpolation unit 108.

As shown in FIG. 4, when a captured image is input from each camera (step S401), the interpolation unit 108 determines an area influenced by distortion of light passing near a ridgeline (step S402), and the interpolation unit 108 interpolates a pixel value of a pixel included in the area influenced by distortion of light passing near the ridgeline by a pixel value of a pixel included in an area that is not influenced by distortion of light passing near the ridgeline (step S403).

The determination of the area influenced by distortion of light passing near the ridgeline can be achieved by either (1) a process (a first determination process) of performing the determination using an image of a common field of view of compound-eye, or (2) a process (a second determination process) of, in advance, capturing an image of a known pattern and calculating pixel coordinates of a pixel located in an area influenced by distortion of light passing near a ridgeline, and, using these coordinates, performing the determination described above.

The first determination process and the second determination process are described below with reference to drawings.

Figure 5:
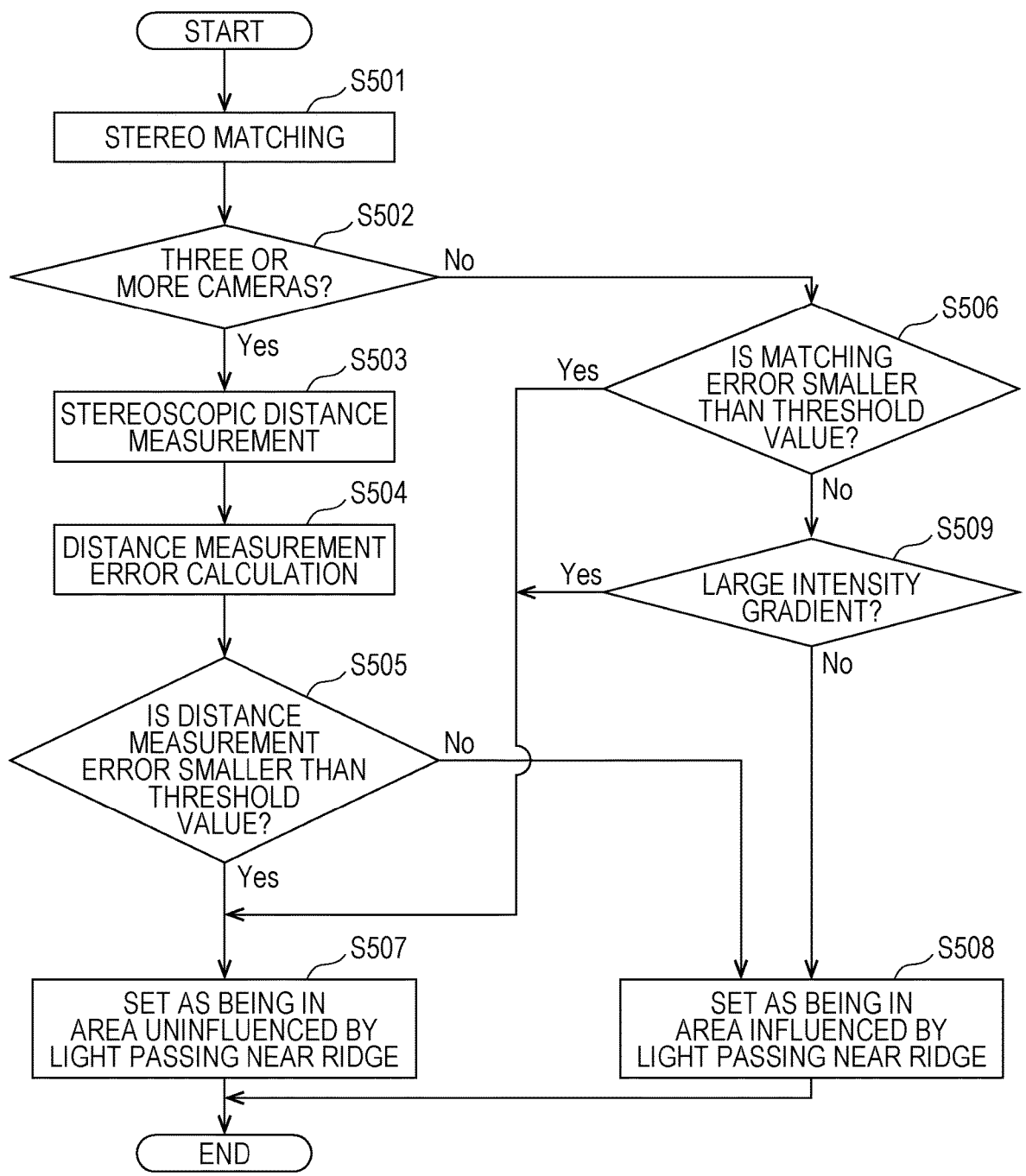
FIG. 5 is a flowchart illustrating a first determination process.

FIG. 5 is a flowchart illustrating the first determination process.

To determine whether an area of interest is an area influenced by distortion of light passing near a ridgeline, the interpolation unit 108 searches an image captured by another camera for an area that matches an area near the pixel of interest in an image captured by a camera of interest (step S501). In this image matching, a matching error is calculated based on a difference in pixel value in a rectangular image area (for example, a square each side of which has a length corresponding to four pixels) used in pixel comparison, and an image area with a minimum matching error is determined as a matched area.

As a specific example of a matching method, block matching is described below.

The interpolation unit 108 calculates a residual sum of squares (SSD), defined below by equation (2), of pixel values in a search area of a search image with reference to pixel values in a reference block centered at a pixel location $(x_0, y_0)$ in a reference image. The interpolation unit 108 detects a pixel location $(u_i, v_j)$ at which a minimum SSD is obtained in the search area, and employs it as an estimated value $(u, v)$ for the pixel location $(x_0, y_0)$.

$$SSD = \sum_{k,l \in w} (f_2(x_0 + u_i + k, y_0 + v_j + l) - f_1(x_0 + k, y_0 + l))^2 \quad (2)$$

In equation (2), $f_1(x, y)$ denotes a luminance value at the pixel location $(x, y)$ in the reference image, $f_2(x, y)$ denotes a luminance value at the pixel location $(x, y)$ in the search image, and w denotes the block area subjected to the correlation calculation.

The description of the first determination process is continued below.

In the determination as to whether the area is influenced by distortion of light passing near a ridgeline, the processing flow branches depending on the number of cameras used (step S502).

In a case where three or more cameras are used, the interpolation unit 108 performs stereoscopic distance measurement using all camera pairs (step S503). For example, in a case where four cameras are used, and more specifically, for example, in a case where the first wide-angle camera, the second wide-angle camera, the third wide-angle camera, and the fourth wide-angle camera are used, stereoscopic distance measurement is performed using a pair of the first wide-angle camera and the second wide-angle camera, stereoscopic distance measurement is performed using a pair of the first wide-angle camera and the third wide-angle camera, stereoscopic distance measurement is performed using a pair of the first wide-angle camera and the fourth wide-angle camera, stereoscopic distance measurement is performed using a pair of the second wide-angle camera and the third wide-angle camera, stereoscopic distance measurement is performed using a pair of the second wide-angle camera and the fourth wide-angle camera, and stereoscopic distance measurement is performed using a pair of the third wide-angle camera and the fourth wide-angle camera.

The interpolation unit 108 calculates a distance measurement error based on differences in world coordinates or depth distance values calculated in distance measurement in step S503 (step S504).

The interpolation unit 108 then compares the distance measurement error calculated in step S504 with a threshold value based on a distance measurement error estimated from a camera parameter error (step S505). The threshold value may be determined based on the fact that there is a correlation between the distance measurement error and the camera parameter error. In the stereoscopic distance measurement, a triangle whose vertices are located at the measurement target and two cameras is determined, and the location of the measurement target is calculated based on the principle of triangulation. Therefore, in a case where a directional vector from the camera location to the measurement target is calculated from camera parameters, a distance measurement error due to a camera parameter error occurs. The error of the directional vector from the camera location to the measurement target may be estimated from a reprojection error of the camera parameter. The reprojection error is a distance between calculated image coordinates obtained by projecting the world coordinates onto an image using the camera parameter and true image coordinates corresponding to the calculated image coordinates. The reprojection error is used as an evaluation value of a known camera calibration method such as a Tsai method or the like, and the reprojection error may be acquired when camera parameters are calculated. The error of the directional vector from the camera location to the measurement target may be estimated from the camera model and the reprojection error. For example, in a case where the camera model of the pinhole camera represented by equation (1) is used, when the camera center Cx and Cy are respectively set to be one-half the number of pixels in the vertical and horizontal directions of the captured image, an identity matrix is used as the rotation matrix R, and the translation Tx, Ty, Tz are respectively set to be equal to 0, then a relationship between the image coordinates and the directional vector from the camera location to the measurement target can be represented by equation (3).

$$\begin{bmatrix} x \\ y \end{bmatrix} = f \begin{bmatrix} \frac{1}{d'x} \frac{X}{Z} \\ \frac{1}{d'y} \frac{Y}{Z} \end{bmatrix} = f \begin{bmatrix} \frac{1}{d'x} \tan \omega_x \\ \frac{1}{d'y} \tan \omega_y \end{bmatrix} \quad (3)$$

In equation (3), $\omega_x$ and $\omega_y$ denote x and y components of an angle between the optical axis of the camera and the directional vector from the camera location to the measurement target. Let $\Delta x$ and $\Delta y$ respectively denote errors of the x component and the y component of the reprojection error, and let $\Delta \omega_x$ and $\Delta \omega_y$ respectively denote errors of the x component and the y component of the angle between the directional vector and the optical axis of the camera (equation (4)).

$$\begin{bmatrix} \Delta \omega_x \\ \Delta \omega_y \end{bmatrix} = \begin{bmatrix} \tan^{-1}\left(\frac{d'x \cdot \Delta x}{f}\right) \\ \tan^{-1}\left(\frac{d'y \cdot \Delta y}{f}\right) \end{bmatrix} \quad (4)$$

A relationship between the distance measurement error and the error $\Delta \omega_x$ and $\Delta \omega_y$ of the directional vector from the camera location to the measurement target can be estimated depending on the distance to the distance measurement target. When there is an error in the directional vector from the camera location to the measurement target, two straight lines on directional vectors of two cameras do not pass through the distance measurement target and are at twisted locations. An approximate location of an intersection point of the two straight lines can be calculated as a location where the two straight lines are the closest to each other.

In a case where it is determined in step S505 that the distance measurement error is smaller than the threshold value, a pixel is set in an area which is not influenced by distortion of light passing near a ridgeline (step S507). In a case where it is determined that the distance measurement error is greater than the threshold value, a pixel is set in an area influenced by distortion of light passing near a ridgeline (step S508). These settings may be performed individually for each of pixels.

In a case where it is determined in step S502 that the number of cameras used is smaller than 3, the matching error is compared with a threshold value based on image noise, or the matching error is compared with a threshold value based on a pixel sampling error (step S506). For example, the threshold value may be set to a value which is greater than an average luminance noise level taken over the entire image by a constant factor (for example, by a factor of 2 to 3).

The luminance noise level of the image may be calculated, for example, as follows.

N frames (for example 100 frames) of the same scene are captured, and the variance and the standard deviation of the luminance value can be calculated for each pixel over the N frames. The average value of standard deviations of the respective pixels taken for all pixels is employed as a luminance noise level taken over all pixels.

In the block matching, even for the same subject area, a matching error approximately equal to a luminance noise level across the whole image can occur. Therefore, it may be reasonable that the threshold value in the matching evaluation is set to a constant multiple (about 2 to 3) of the luminance noise level.

In a case where it is determined in step S506 that the matching error is smaller than the threshold value, a pixel of interest is set, in step S507, in an area which is not influenced by distortion of light passing near a ridgeline. However, in a case where the matching error is greater than the threshold value, the processing proceeds to step S509.

In the process in step S509, the interpolation unit 108 makes a comparison of a luminance gradient value (a greater luminance gradient results in a sharper image) between two corresponding blocks which are included in different images and which are greater in matching error than the threshold value. In step S507, the interpolation unit 108 sets a block having a greater luminance gradient as an area that is not influenced by distortion of light passing near a ridgeline. In step S508, the interpolation unit 108 sets a block having a smaller luminance gradient as an area that is influenced by distortion of light passing near a ridgeline.

In the case where three or more cameras are used, the determination as to whether the area is influenced by distortion of light passing near a ridgeline may be performed based on the matching error.

Next, the second determination process is described.

To perform the second determination process, the image capturing apparatus 101 further includes a storage unit that stores area identification information for identifying an area influenced by distortion of light passing near a ridgeline.

It is possible to identify a blur area on an image due to a region near a ridgeline by capturing an image of a known pattern in advance. As for the known pattern, for example, a grid line or a checker pattern may be used. In a case where a two-color or black-and-white pattern is used, a gray color appears in a blur area and edges are lost. The storage unit stores pixel coordinates of pixels located in this blur area as area identification information.

FIG. 6 is a flowchart illustrating the second determination process.

The interpolation unit 108 accesses area identification information stored in the storage unit to check whether a pixel of interest is in an area influenced by distortion of light passing near a ridgeline (step S601).

In a case where it is determined in step S601 that the pixel of interest is in an area influenced by distortion of light passing near a ridgeline, the interpolation unit 108 sets the pixel of interest in the area influenced by distortion of light passing near the ridgeline (step S602). In a case where the pixel of interest is not influenced by distortion of light passing near a ridgeline, the interpolation unit 108 sets the pixel of interest in an area which is not influenced by distortion of light passing near the ridgeline (step S603).

Referring again to FIG. 4, the explanation is continued.

The image synthesis unit 109 synthesizes a single image including no area influenced by distortion of light passing near a ridgeline such that the pixel value in an area influenced by distortion of light passing near a ridgeline is interpolated by the interpolation unit 108 (step S403). The image output unit 110 outputs the image generated by the image synthesis unit 109.

FIG. 7 is a flowchart illustrating a process in an interpolation step (step S403). The process of interpolating a pixel value in a shielded area branches depending on the number of cameras used (step S701).

In a case where three or more cameras are used, world coordinates corresponding to an area influenced by distortion of light passing near a ridgeline are calculated based on the world coordinates calculated by the stereoscopic distance measurement using all camera pairs in step S402 of determining whether the area is influenced by distortion of light passing near a ridgeline (step S702). In the calculation of the world coordinates, stereoscopic distance measurement results by all camera pairs may be averaged and/or a location where distance measurement points are located close to each other may be selected.

A specific example of a method of calculating the world coordinates is described below with reference to drawings.

FIG. 8 is a schematic diagram illustrating a world coordinate calculation performed by a four-eye system.

In a case where stereoscopic distance measurement is performed using a four-eye system, there are six selectable camera pairs, and the distance measurement points of these camera pairs are denoted as P1 to P6. In a case where three points are selected from P1 to P6, it is assumed by way of example that a minimum variance is obtained for a combination of P1 to P3. Here the variance is given by the average of variances of the respective X, Y, and Z components of 3-dimensional coordinates.

In this case, the world coordinates of the distance measurement point Q as a whole of four-eye system may be given by a barycenter G of P1 to P6 (where G(X, Y, Z) is the average of the X, Y, and Z components of the 3-dimensional coordinates of P1 to P6) or by a barycenter Q of a combination of distance measurement points (P1 to P3 in FIG. 8) located close to each other.

Referring again to FIG. 7, the explanation of the interpolation step (step S403) is continued.

In a captured image A1 captured by the camera of interest P1, a pixel value C1 of a pixel B1 in an area influenced by distortion of light passing near a ridgeline is interpolated by a pixel value C2 of a pixel B2 corresponding to world coordinates W, calculated in step S702, of the pixel B1 included in the area influenced by distortion of light passing near the ridgeline. This pixel value C2 of the corresponding pixel B2 may be determined as follows. A captured image A2 is captured by another camera P2 different from the camera of interest, and the world coordinates are projected onto this captured image A2 using camera parameters of the camera P2. Resultant pixel coordinates of the projected world coordinates are determined, and further a pixel value of a pixel corresponding to the pixel coordinates is determined (step S703). To use the captured image A2, it is presupposed that the projected pixel B2 is included in an area that is not influenced by distortion of light passing near the ridgeline in the captured image A2.

In a case where it is determined in step S701 that the number of cameras used is less than 3, the pixel value is interpolated using a neighboring pixel by a known interpolation method such as bilinear interpolation, bicubic interpolation, or the like (step S704).

In the image capturing apparatus 101 configured in the above-described manner, as a result of the interpolation of pixel values in areas influenced by distortion of light passing near ridgelines, no defect due to distortion of light passing near the ridgelines of the lens cover 106 occurs in the output image.

An explanation is given below for a case where the number of cameras is not four.

Figure 9A:
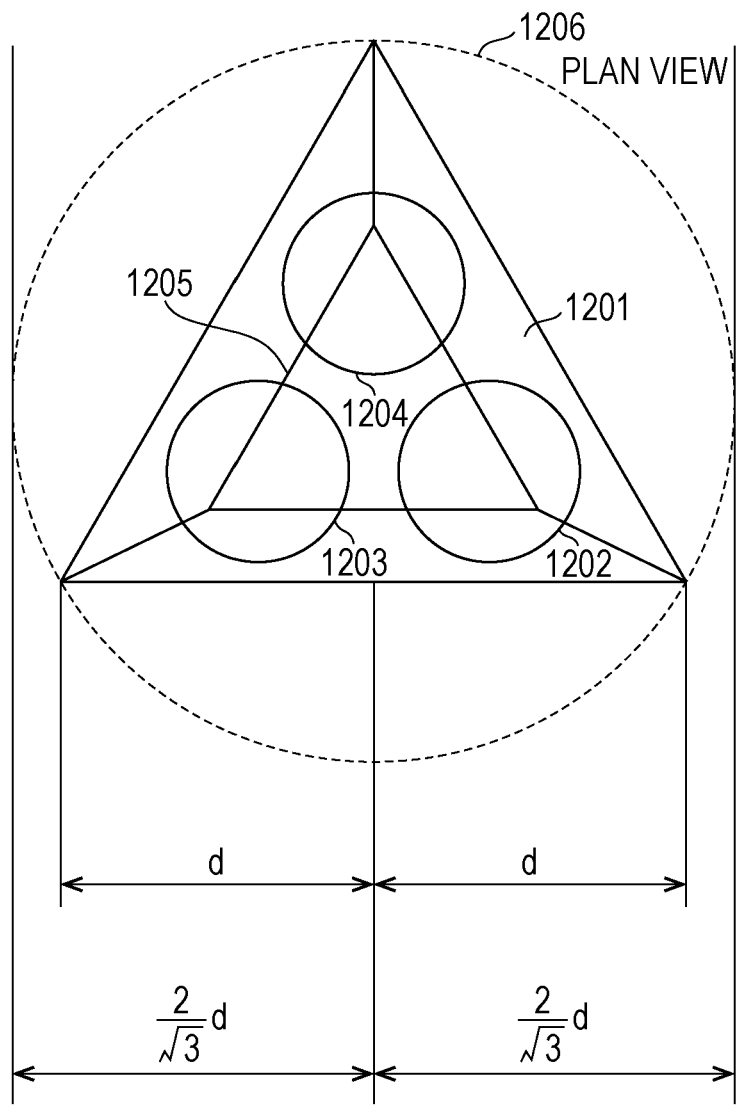
FIG. 9A is a plan view illustrating a positional relationship between a wide-angle camera and a lens cover.
Figure 9B:
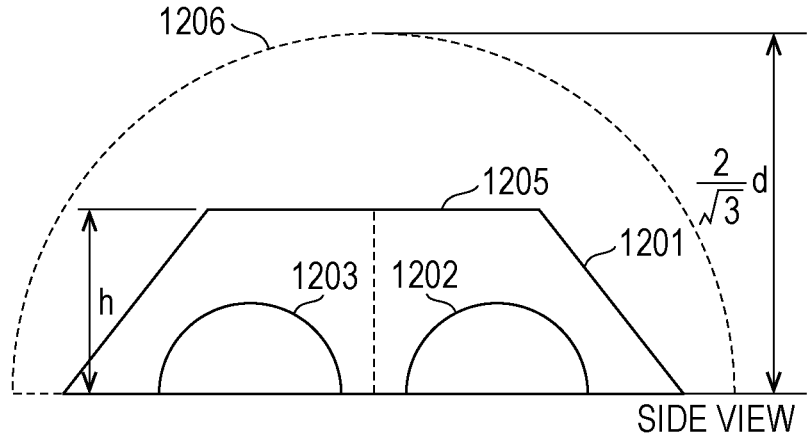
FIG. 9B is a side view illustrating a positional relationship between a wide-angle camera and a lens cover.

FIG. 9A and FIG. 9B illustrate a lens cover 1201 for a case where there are three cameras and lenses are disposed symmetrically. In FIG. 9A and FIG. 9B, a lens 1202 of a first wide-angle camera, a lens 1203 of a second wide-angle camera, and a lens 1204 of a third wide-angle camera are disposed in a form of an equilateral triangle, where 1205 denotes an upper face of the lens cover 1201 in the form of a triangular frustum.

Figure 10A:
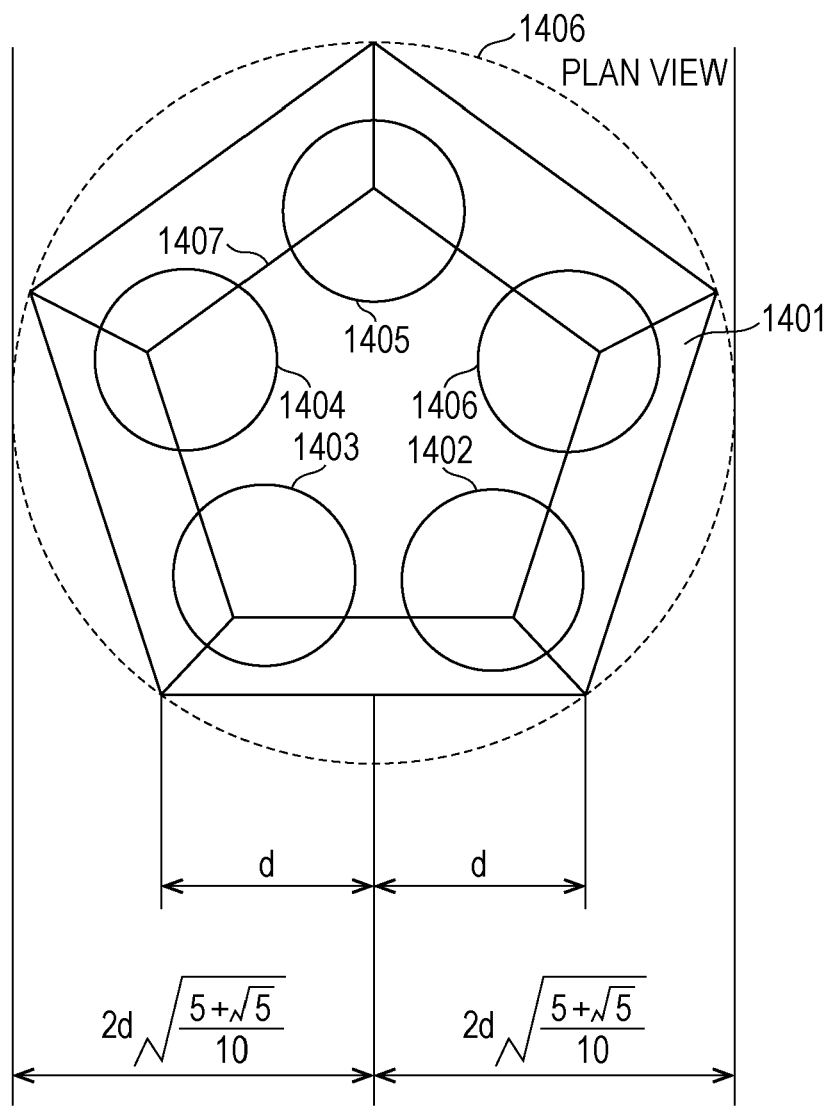
FIG. 10A is a plan view illustrating a positional relationship between a wide-angle camera and a lens cover.
Figure 10B:
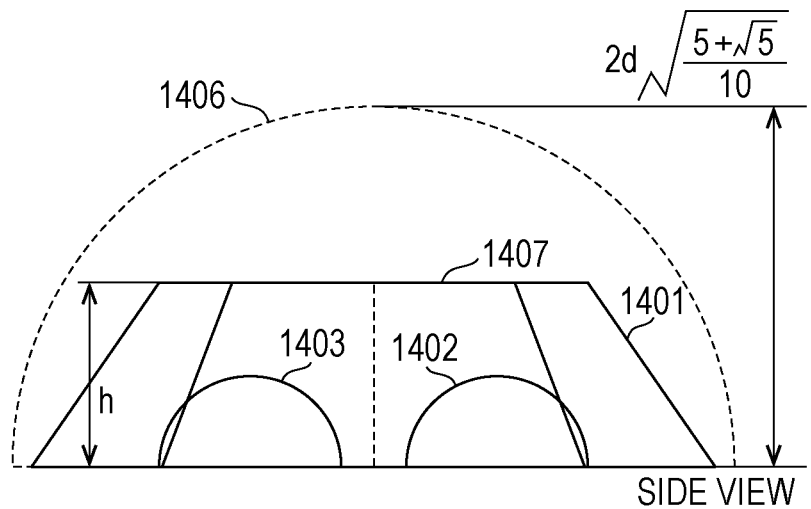
FIG. 10B is a side view illustrating a positional relationship between a wide-angle camera and a lens cover.

FIG. 10A and FIG. 10B illustrate a lens cover 1401 for a case where there are five cameras and lenses are disposed symmetrically. In FIG. 10A and FIG. 10B, a lens 1402 of a first wide-angle camera, a lens 1403 of a second wide-angle camera, a lens 1404 of a third wide-angle camera, a lens 1405 of a fourth wide-angle camera, and a lens 1406 of a fifth wide-angle camera are disposed in a form of a regular pentagon, where 1407 denotes an upper face of the lens cover 1401 in the form of pentagonal frustum.

Figure 11A:
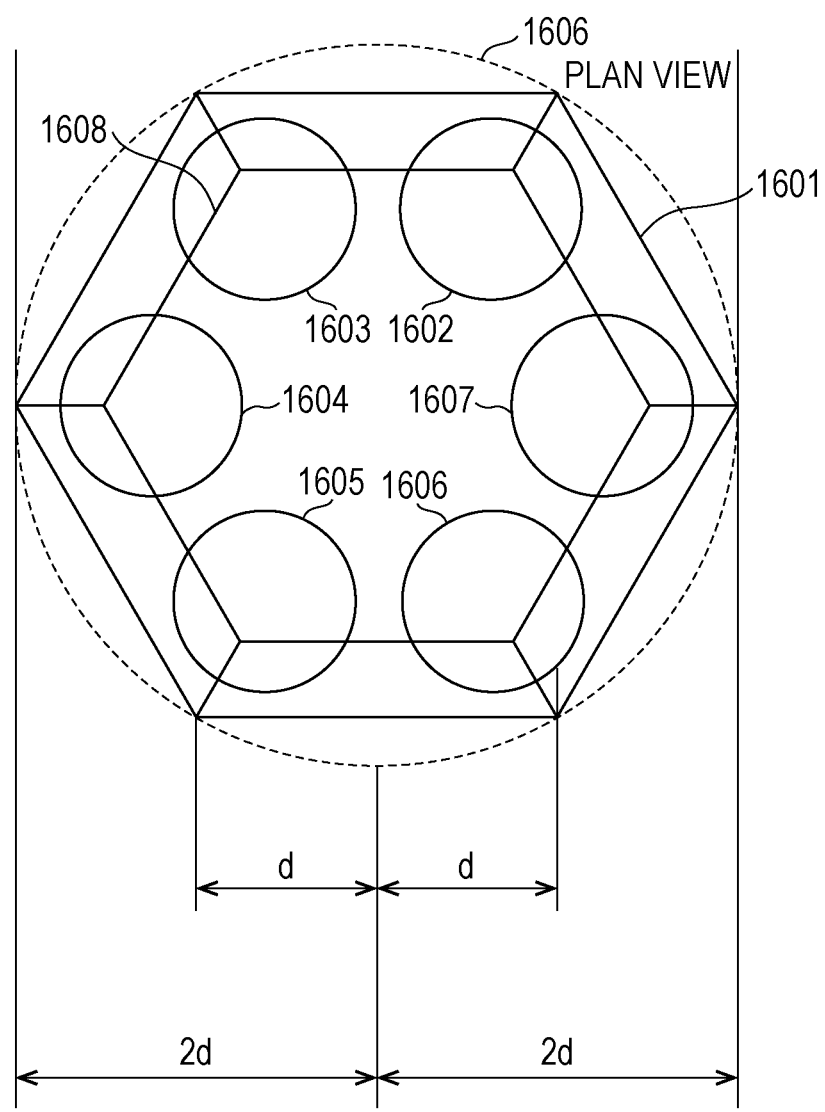
FIG. 11A is a plan view illustrating a positional relationship between a wide-angle camera and a lens cover.
Figure 11B:
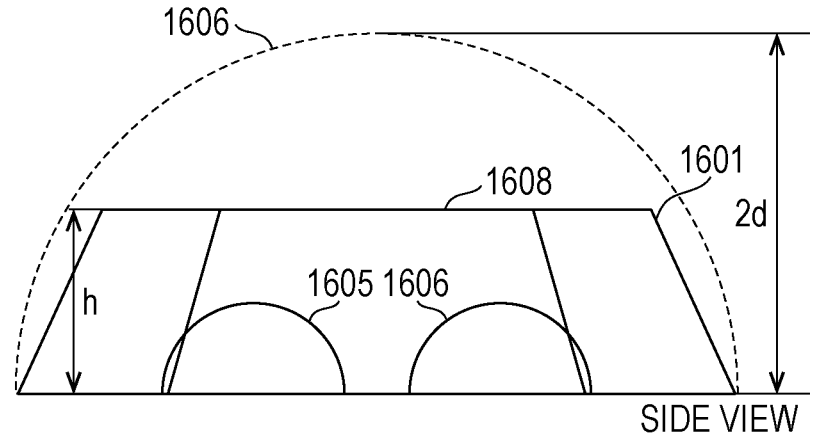
FIG. 11B is a side view illustrating a positional relationship between a wide-angle camera and a lens cover.

FIG. 11A and FIG. 11B illustrate a lens cover 1601 for a case where there are six cameras and lenses are disposed symmetrically. In FIG. 11A and FIG. 11B, a lens 1602 of a first wide-angle camera, a lens 1603 of a second wide-angle camera, a lens 1604 of a third wide-angle camera, a lens 1605 of a fourth wide-angle camera a lens 1606 of a fifth wide-angle camera, and a lens 1607 of a sixth wide-angle camera are disposed in a form of a regular hexagon, where 1608 denotes an upper face of the lens cover 1601 in the form of a hexagonal frustum.

In other cases where the number of cameras is not in a range of 3 to 6 or the lenses are not disposed symmetrically, the lens cover may be formed so as to have an external shape of a frustum whose bottom face is given by an upper surface of a base. An area influenced by distortion of light passing near a ridgeline in each camera may be determined from a positional relationship between ridgelines of the lens cover and pixels on an image sensing device.

The shape of the lens cover is not limited to a right frustum as long as the lens cover covers the upper surface of the base on which camera lenses are disposed. Examples of lens covers having an external shape other than the right frustum are illustrated in FIG. 12A, FIG. 12B, FIG. 13A, and FIG. 13B.

Figure 12A:
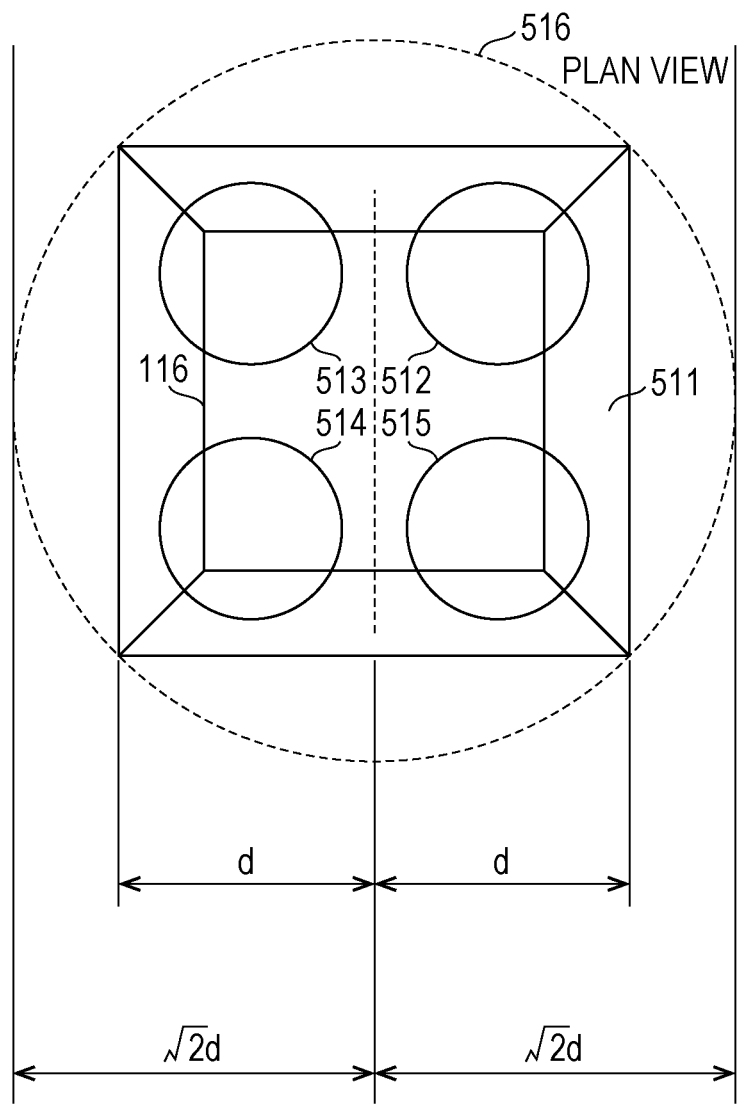
FIG. 12A is a plan view illustrating a positional relationship between a wide-angle camera and a lens cover.
Figure 12B:
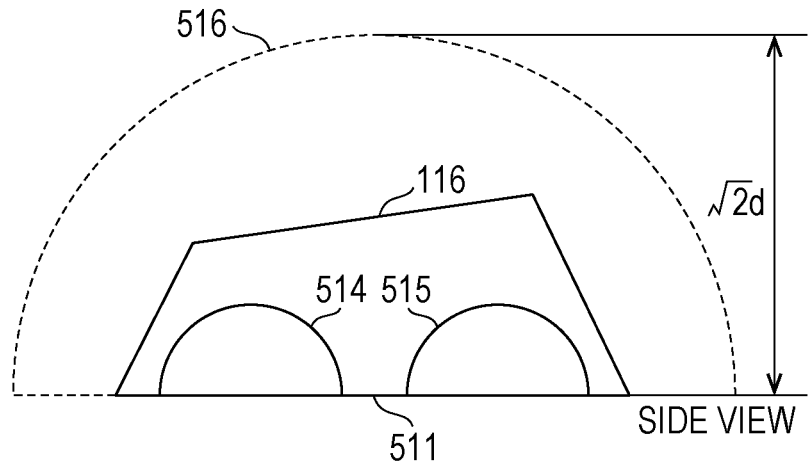
FIG. 12B is a side view illustrating a positional relationship between a wide-angle camera and a lens cover.

In FIG. 12A and FIG. 12B, 511 denotes a base, 512 to 515 respectively denote lenses of a first wide-angle camera 102 to a fourth wide-angle camera 105, and 116 denotes a lens cover.

In FIG. 12A and FIG. 12B, the upper part of the lens cover 116 is not parallel to the upper surface of the base 511. The upper surface of the lens cover 116 is tilted such that an angle between a normal vector of the upper part of the lens cover 116 and a normal vector of the upper surface of the base 511 is more than 0° and 30° or less. Note that in FIG. 12A and FIG. 12B, the plate thickness of the lens cover 116 is not taken into account. The outer surface of the upper part of the lens cover 116 and the corresponding inner surface may be considered to be parallel to each other. That is, the outer surface and the corresponding inner surface of the upper part of the lens cover 116 are not parallel to the upper surface of the base 511. The normal vector of the upper surface of the upper part of the lens cover 116 may be given by either the normal vector of the outer surface of the upper part of the lens cover 116 or the normal vector of the inner surface of the upper part of the lens cover 116.

Figure 12C:
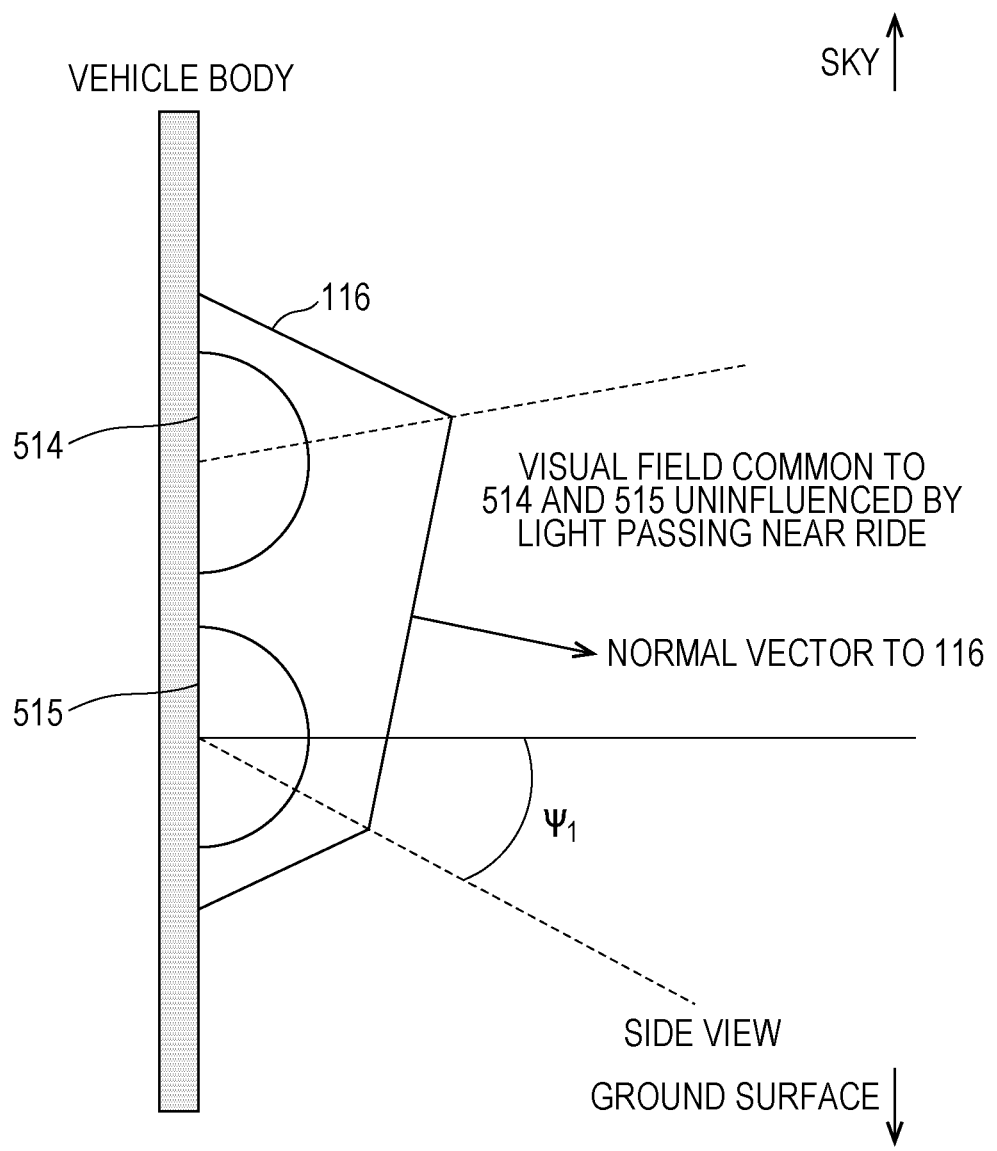
FIG. 12C is a side view illustrating a positional relationship between a wide-angle camera and a lens cover for use in vehicle.

By inclining the upper part of the lens cover 116 with respect to the upper surface of the base camera module 511, it becomes possible to enlarge a common field of view which is not influenced by distortion of light passing near ridgelines of the lens cover 116. For example, for use in vehicle, an image of a part on the ground surface side is important compared with an image of a part on the sky side, and thus the lens cover may be disposed as shown in FIG. 12C. That is, the lens cover 116 may be disposed such that the normal vector of the upper part of the lens cover 116 points in a direction toward the ground surface.

Figure 13A:
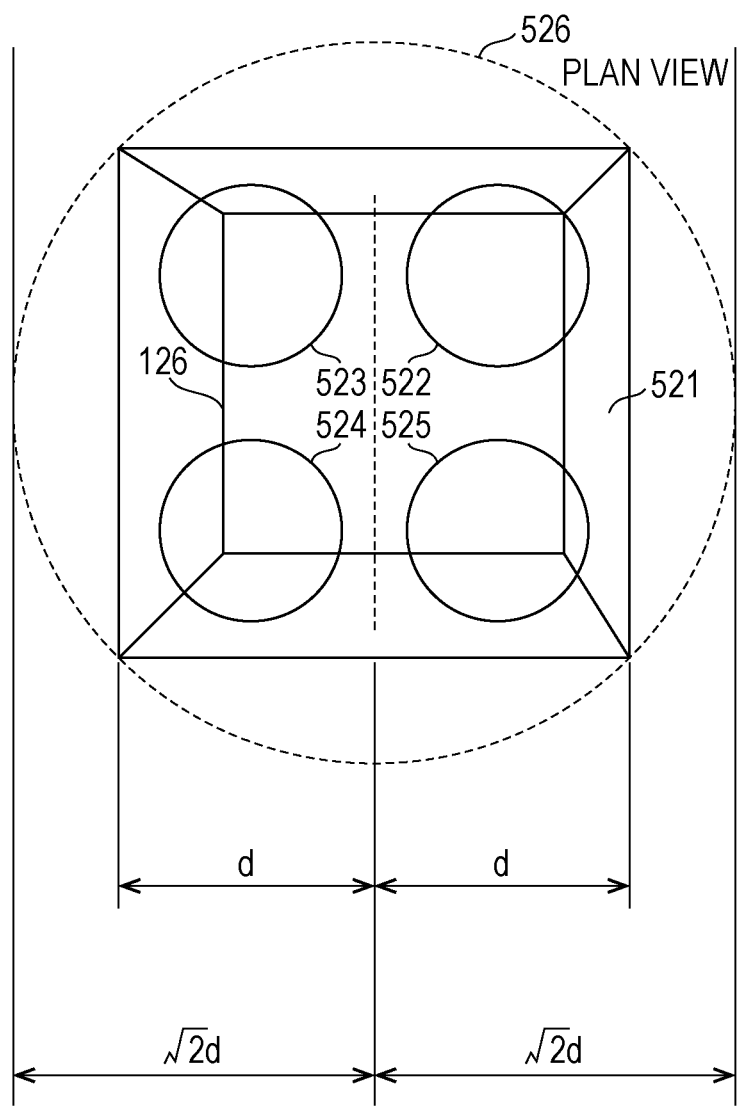
FIG. 13A is a plan view illustrating a positional relationship between a wide-angle camera and a lens cover.
Figure 13B:
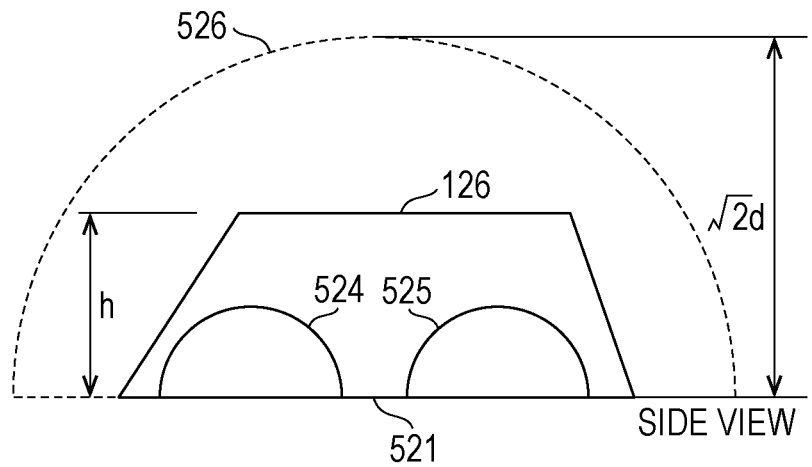
FIG. 13B is a side view illustrating a positional relationship between a wide-angle camera and a lens cover.

In FIG. 13A and FIG. 13B, 521 denotes a base, 522 to 525 respectively denote lenses of a first wide-angle camera 102 to a fourth wide-angle camera 105, and 126 denotes a lens cover.

In FIG. 13A and FIG. 13B, the upper part of the lens cover 126 is parallel to the upper surface of the base 521. Note that although in FIG. 13A and FIG. 13B, the plate thickness of the lens cover 126 is not taken into account, the outer surface and the corresponding inner surface of the upper part of the lens cover 126 may be considered to be parallel to each other. That is, the outer surface and the corresponding inner surface of the upper part of the lens cover 126 are both parallel to the upper surface of the base 521. On the other hand, when the lens cover 126 is seen in plan view, the location of the barycenter of the outer surface of the upper part of the lens cover 126 is shifted from the center of the centers of the lenses 523 to 525 of the respective first to fourth wide-angle cameras disposed on the upper surface of the base.

Figure 13C:
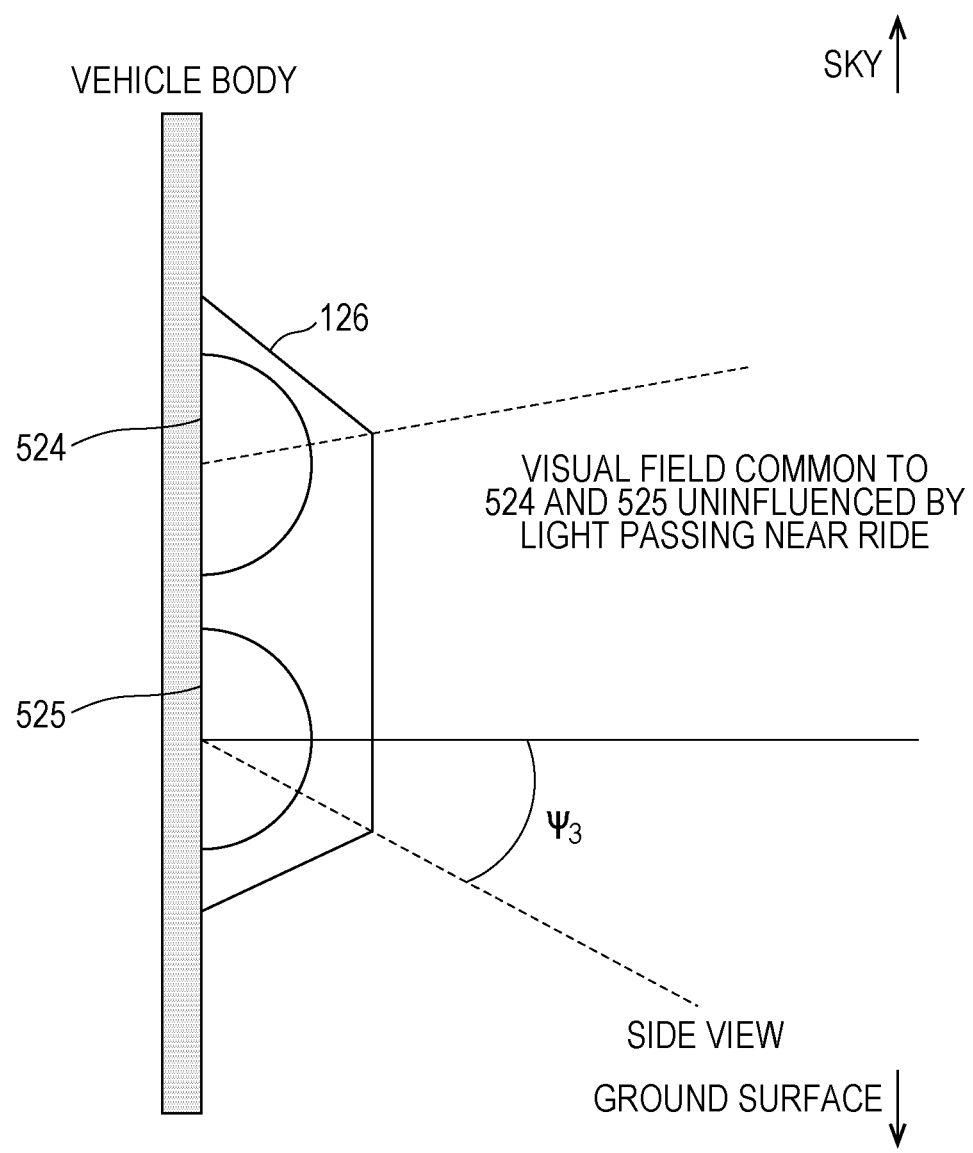
FIG. 13C is a side view illustrating a positional relationship between a wide-angle camera and a lens cover for use in vehicle.
Figure 13D:
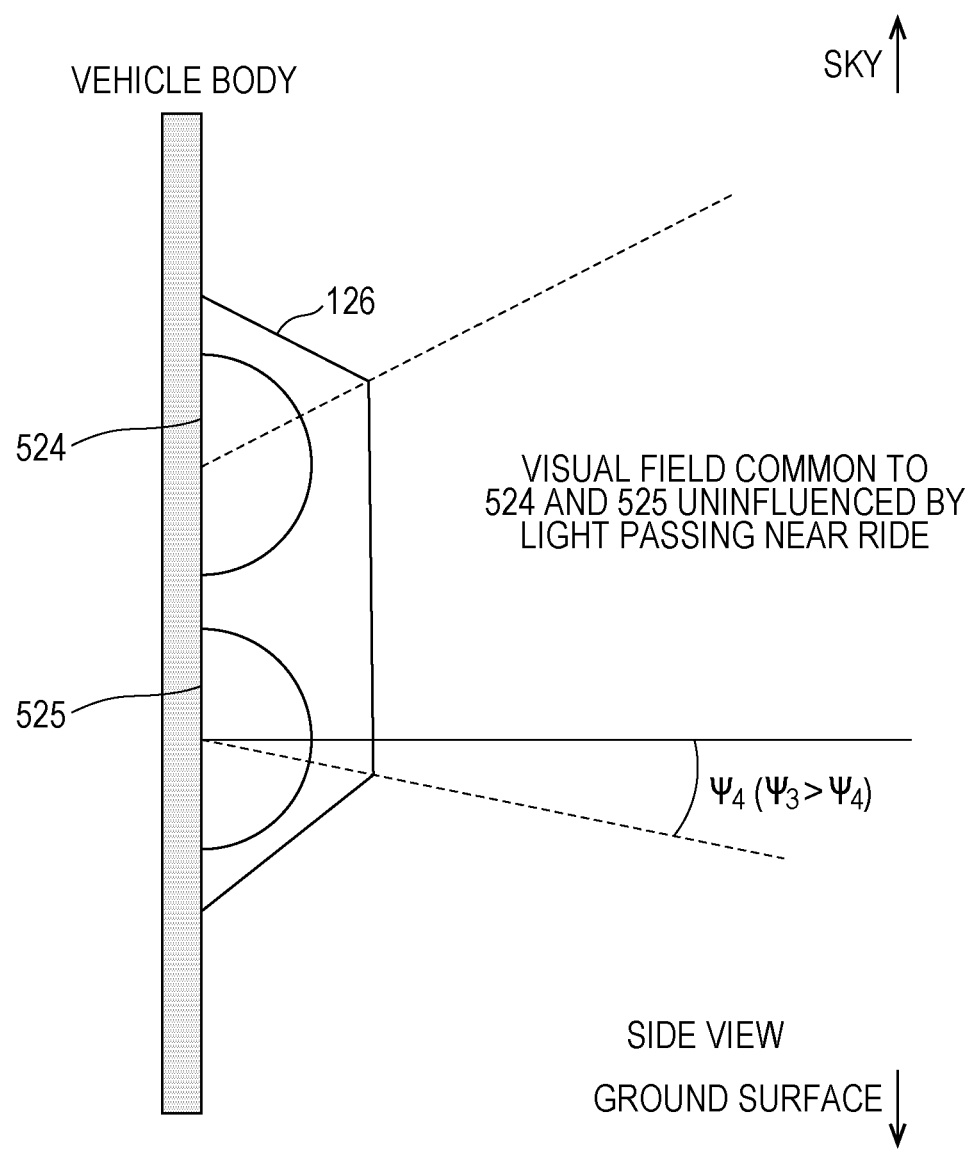
FIG. 13D is a side view illustrating a positional relationship between a wide-angle camera and a lens cover for use in vehicle.

By performing translation while maintaining the upper part and the lower part of the lens cover 126 to be parallel to each other, it is possible to increase the common field of view which is not influenced by distortion of light passing near a ridgeline of the lens cover 126. For example, for use in vehicle, an image of a part on the ground surface side is important compared with an image of a part on the sky side, and thus the lens cover may be disposed as shown in FIG. 13C. That is, the lens cover 126 may be disposed such that the normal vector of the upper part of the lens cover 126 points in a direction toward the ground surface.

A reduction in influence of distortion of light passing near ridgelines can be achieved also in a similar-shape lens cover, and thus a threshold value in terms of the lens cover size or the like is defined by a ratio with respect to the whole lens cover. In a case where a hemispherical lens cover defined by one-half of a sphere is used, it is possible to define the lens cover size only by a radius of the sphere. In the hemispherical lens cover, the lens cover size corresponds to a diameter of the sphere, or corresponds to a diameter of the lens cover when seen in plan view.

On the other hand, the size of a frustum-shape lens cover may be defined in various ways. Here, to provide a measure that is effective to represent the frustum-shape lens cover size, an average base line length D is defined.

$$D = \frac{1}{M}\sum_{i=1}^{M} d_i, M =_N C_2 \quad (6)$$

In equation (6), N denotes the number of cameras (the number of lenses) and d denotes a base line length (distance between lenses).

By using the average base line length, it is possible to define the lens cover size even in a case where lenses are disposed irregularly. Note that instead of using the average of base line lengths, a minimum value, a maximum value, a median, or a standard deviation may be used.

Figure 26:
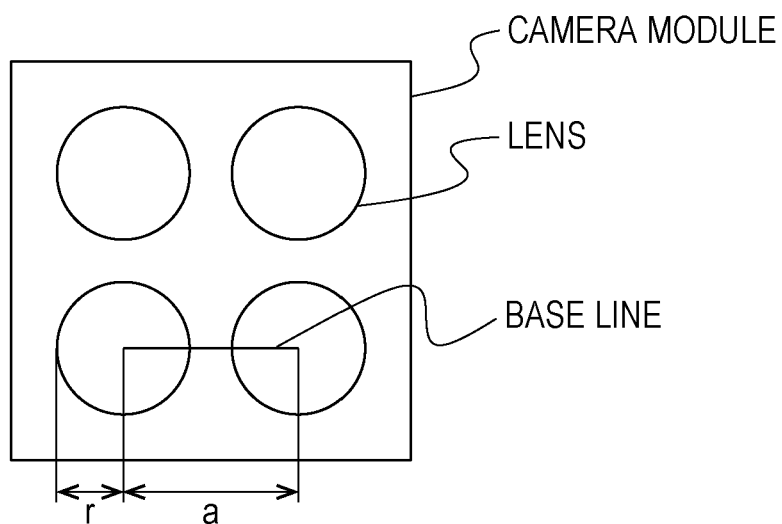
FIG. 26 is a plan view illustrating a lens cover.

It is not allowed to dispose two or more lenses at the same location, and thus D>0 for N≥2. In a case where lenses are disposed in the form of a regular square as shown in FIG. 26, if the distance between lenses in a horizontal direction is denoted by a, then $$D=a(2+\sqrt{2})/3 \quad (7)$$

is obtained.

Figure 27:
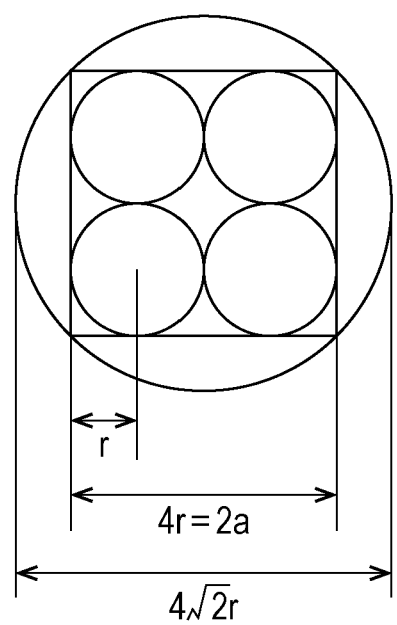
FIG. 27 is a plan view illustrating a lens cover.

In an example shown in FIG. 27, lenses are disposed in a closed-packed structure, and a base used has a regular square surface having a minimum allowable size. It is assumed that each lens is symmetrical about its optical axis, and the radius of the lens is defined by a maximum distance r from the optical axis. For example, in a case where four lenses each having a radius r are used, a minimum allowable radius of a spherical lens cover is given by $2\sqrt{2}r$.

The lower limit of the average base line length D is obtained when the lenses are disposed in the closest-packed structure as described above (the upper limit depends on the size of the surface of the base, and the upper limit occurs when lenses are disposed so as to be in contact with edges of the surface of the base). Thus, it is possible to define a threshold value in terms of lens cover size or the like by a constant multiple of the average base line length or the like. For example, the lens cover size is greater than or equal to $$2\sqrt{2} \times r$$

and smaller than or equal to three times the average base line length.

Further other shapes of a lens cover are described below in Embodiment 2.

EMBODIMENT 2

Twisted Frustum Shape

The shape of the lens cover according to Embodiment 1 is not limited to the frustum. If the upper face of the frustum is rotated by θ (θ≠0) in a plane in which the upper face is located, then this result in a polyhedron with an upper face whose sides are at twisted locations with respect to the sides of the bottom face. This polyhedron is called a twisted frustum. For simplicity, the following description is given for a case that four wide-angle cameras similar to those according to Embodiment 1 are used.

In the image capturing apparatus according to Embodiment 2, the image capturing apparatus 101 according to Embodiment 1 is modified such that the lens cover 106 is replaced by a lens cover 631 described later (see FIG. 14A and FIG. 14B).

Figure 14A:
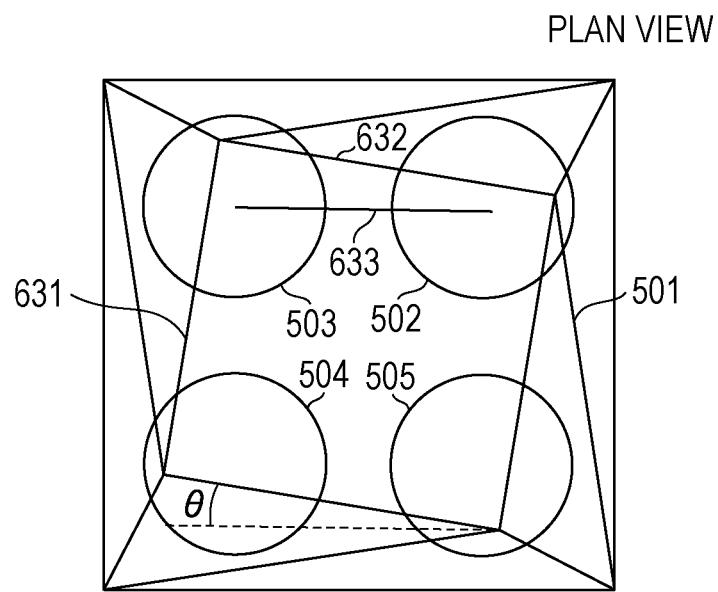
FIG. 14A is a plan view illustrating a positional relationship between a wide-angle camera and a lens cover.
Figure 14B:
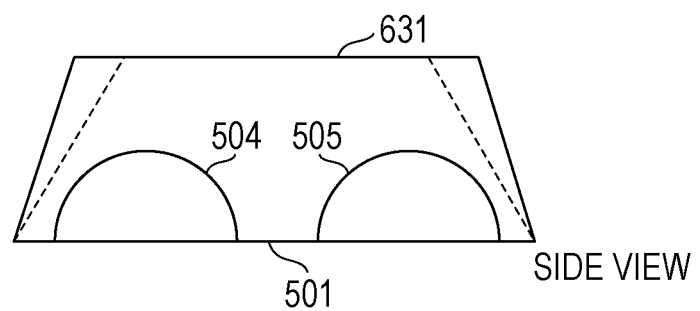
FIG. 14B is a side view illustrating a positional relationship between a wide-angle camera and a lens cover.

FIG. 14A and FIG. 14B are diagrams illustrating a manner in which wide-angle cameras and a twisted frustum-shape lens cover are disposed. In FIG. 14, similar constituent elements in Embodiment 1 are denoted by similar reference signs used in FIG. 2A and FIG. 2B, and a further description thereof is omitted. 631 denotes a lens cover with an external shape of a twisted frustum, 632 denotes a side, of the four sides of the upper face of 631, which forms a rectangle with a smallest area size when the rectangle is formed such that the side and a line segment extending between the lenses 502 and 503 are included in the formed rectangle among all possible rectangles that can be formed using one of the four sides, and 633 denotes a line segment (base line) extending between the center of the lens 502 and the center of the lens 503. In a case where the four lenses each have a shape of a hemisphere, each of the four lenses is in contact with the upper surface of the base such that a circle is formed at the intersection between each lens and the upper surface of the base. The center of each circle may be defined as the center of the corresponding lens.

The positional relationship between 632 and 633 is twisted by a rotation angle θ(θ≠0), and 632 and 633 are not parallel to each other. That is, ridgelines surrounding an outer surface of an upper part, which is one of faces of the lens cover 631, are twisted from a base line extending between a first wide-angle camera (a first camera) 102 and a second wide-angle camera (a second camera) 103. In a case where the sides of the upper face of the lens cover are twisted with respect to the camera base line as described above, an influence of distortion of light passing near a ridgeline occurs such that an influence on one point in the world coordinate system in space occurs only in one camera. In contrast, in a case where a frustum shape is employed, a plane including both a base line and a side of the upper face in a 3-dimensional space (in the case of the frustum shape, a base line and a side of the upper face are parallel to each other, and there exists a plane including the base line and the side) is an area influenced by distortion of light passing near a ridgeline for both cameras in a camera pair forming the base line.

In the example shown in FIG. 14A and FIG. 14B, each side of the outer surface of the upper part of the lens cover 631 is twisted with respect to the base line extending between the lens 502 of the first wide-angle camera (the first camera) and the lens 503 of the second wide-angle camera (the second camera).

As described above, the image capturing apparatus according to Embodiment 2 includes the first wide-angle camera (the first camera) 102 that captures a first image, the second wide-angle camera (the second camera) 103 that captures a second image, the lens cover 631 that includes faces transparent to light, and that covers the first wide-angle camera (the first camera) 102 and the second wide-angle camera (the second camera) 103, and the processing circuit 111 that identifies, in the first image, a pixel located in an area influenced by distortion of light passing near a ridgeline at a boundary between two adjacent faces of all faces, and generates an output image using the first image and interpolation pixel information for interpolating a pixel value of the identified pixel, where each of ridgelines surrounding the outer surface of the upper part, which is one of the faces of the lens cover 631, is at a location twisted with respect to the base line extending between the first wide-angle camera (the first camera) 102 and the second wide-angle camera (the second camera) 103.

As described above, by employing a twisted frustum shape as the external shape of the lens cover, it is possible to reduce the number of cameras that capture images including an area influenced by distortion of light passing near a ridgeline of the lens cover. As a result, it becomes possible to easily make interpolation using a pixel value obtained by another camera that captures an image which is not influenced by distortion of light passing near a ridgeline.

An explanation is given below for a case where the number of cameras is not four.

Figure 15A:
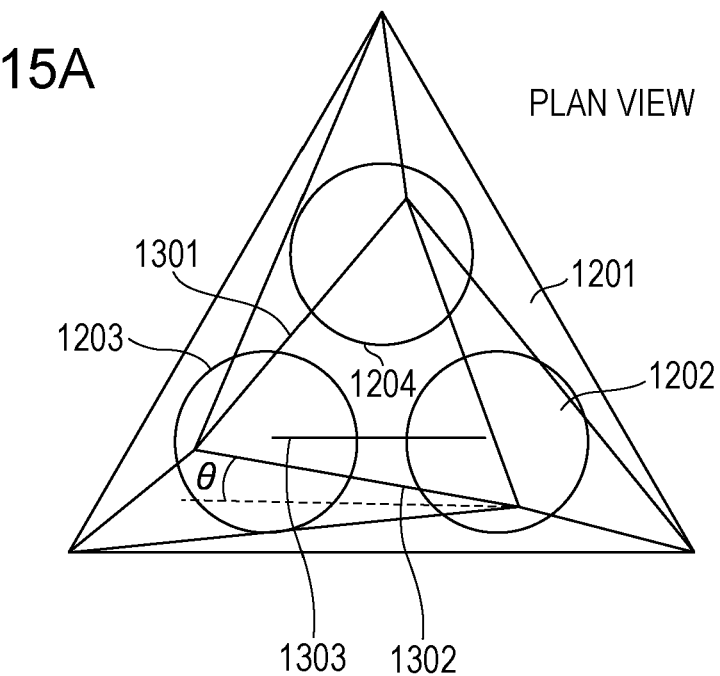
FIG. 15A is a plan view illustrating a positional relationship between a wide-angle camera and a lens cover.
Figure 15B:
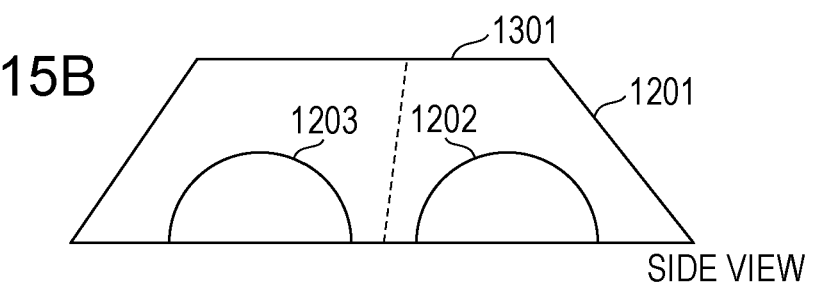
FIG. 15B is a side view illustrating a positional relationship between a wide-angle camera and a lens cover.

FIG. 15A and FIG. 15B are diagrams illustrating a manner in which three wide-angle cameras and a frustum-shape lens cover are disposed. In FIG. 15A and FIG. 15B, the same constituent elements as those in Embodiment 1 are denoted by the same reference signs in FIG. 9A and FIG. 9B, and a further description thereof is omitted. 1301 denotes a lens cover with a shape of a twisted frustum, 1302 denotes a side located closest, among the three sides of the upper face of 1301, to the lens 1202 and the lens 1203, and 1303 denotes a line segment (a base line) extending between the center of the lens 1202 and the center of the lens 1203.

Figure 16A:
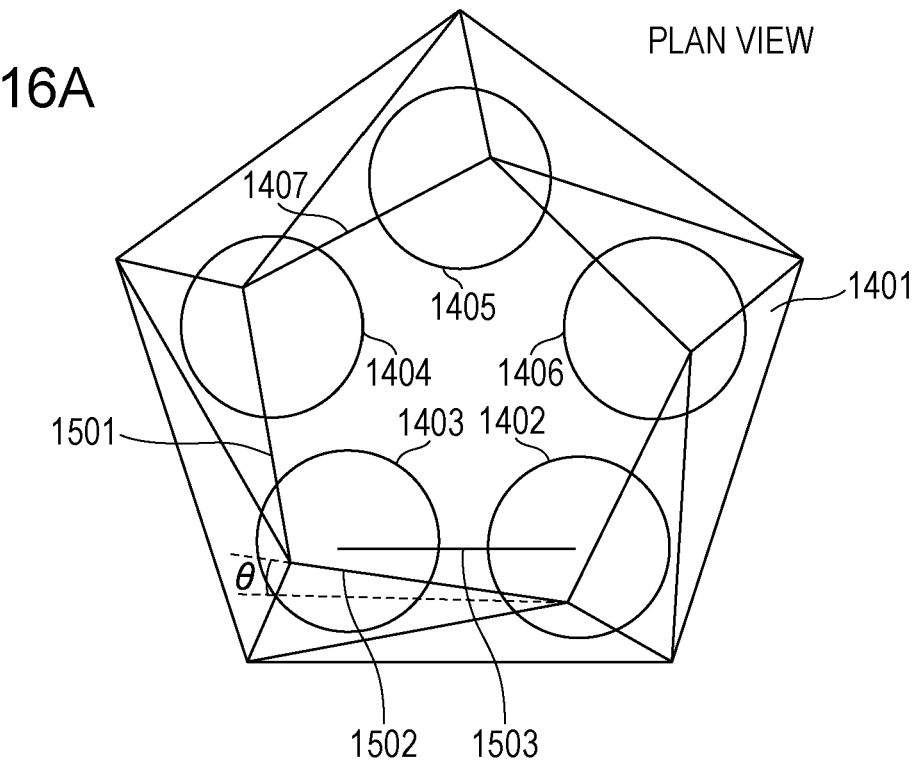
FIG. 16A is a plan view illustrating a positional relationship between a wide-angle camera and a lens cover.
Figure 16B:
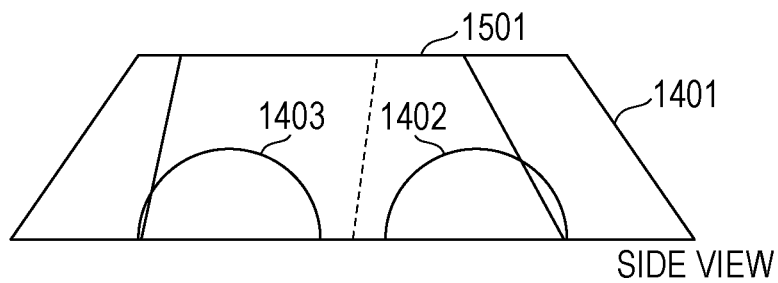
FIG. 16B is a side view illustrating a positional relationship between a wide-angle camera and a lens cover.

FIG. 16A and FIG. 16B are diagrams illustrating a manner in which five wide-angle cameras and a frustum-shape lens cover are disposed. In FIG. 16A and FIG. 16B, the same constituent elements as those in Embodiment 1 are denoted by the same reference signs in FIG. 10A and FIG. 10B, and a further description thereof is omitted. 1501 denotes a lens cover with a shape of a twisted frustum, 1502 denotes a side located closest, among the five sides of the upper face of 1501, to the lens 1402 and the lens 1403, and 1503 denotes a line segment (a base line) extending between the center of the lens 1402 and the center of the lens 1403.

Figure 17A:
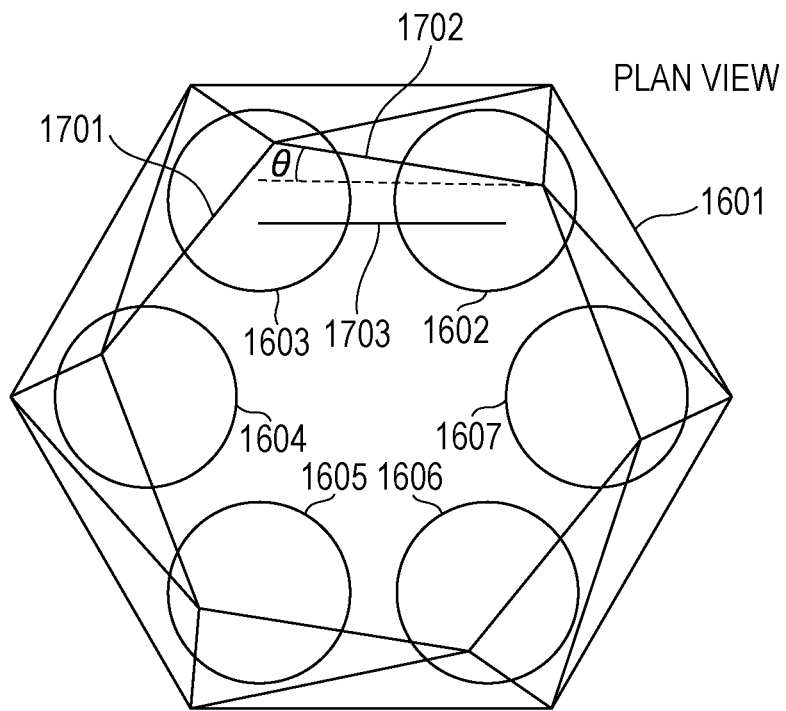
FIG. 17A is a plan view illustrating a positional relationship between a wide-angle camera and a lens cover.
Figure 17B:
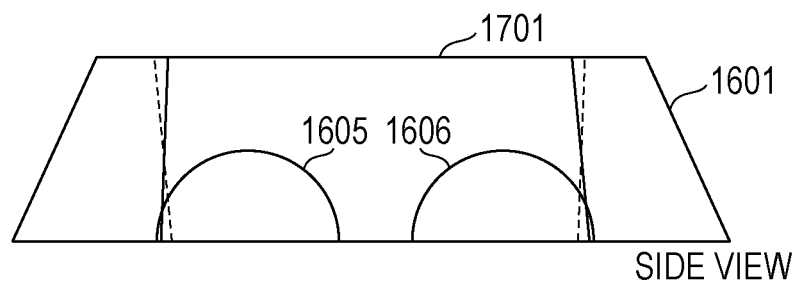
FIG. 17B is a side view illustrating a positional relationship between a wide-angle camera and a lens cover.

FIG. 17A and FIG. 17B are diagrams illustrating a manner in which six wide-angle cameras and a frustum-shape lens cover are disposed. In FIG. 17A and FIG. 17B, similar constituent elements in Embodiment 1 are denoted by the same reference signs in FIG. 16A and FIG. 16B, and a further description thereof is omitted. 1701 denotes a lens cover with a shape of a twisted frustum, 1702 denotes a side located closest, among the six sides of the upper face of 1701, to the lens 1602 and the lens 1603, and 1703 denotes a line segment (a base line) extending between the center of the lens 1602 and the center of the lens 1603.

In other cases where the number of cameras is not in a range of 3 to 6 or in a case where the lenses are not disposed symmetrically, the lens cover may be formed so as to have an external shape of a twisted frustum whose bottom face is given by a base.

EMBODIMENT 3

Incident Light Passes as Perpendicularly as Possible

To reduce the influence of attenuation of incident light, it is preferable to form the shape of the lens cover such that the lens cover face through which the incident light passes is perpendicular to the directional vector of the incident light. Embodiment 3 below describes such a shape formed taking into account the influence of attenuation by the lens cover.

Figure 18:
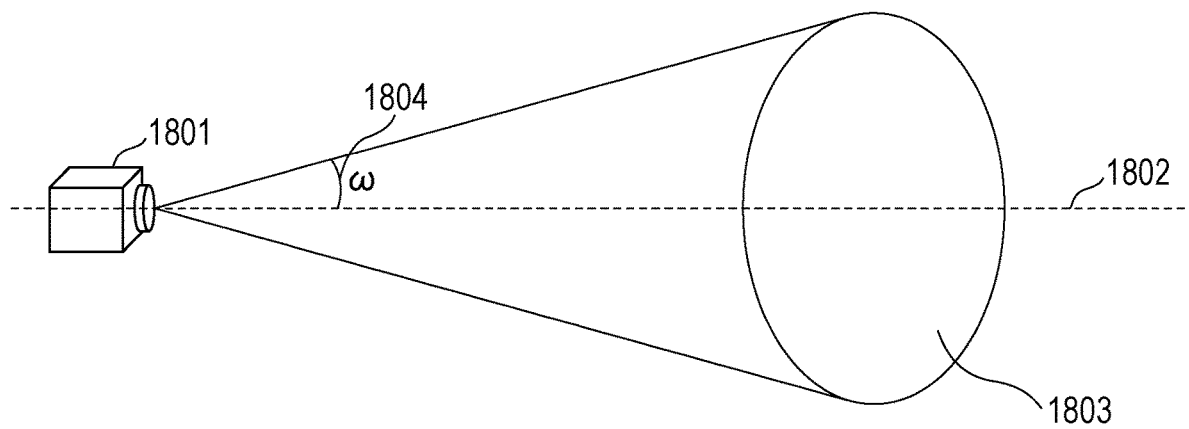
FIG. 18 is a conceptual diagram illustrating a field of view of a camera.

FIG. 18 is a conceptual diagram illustrating a field of view of a camera, in which 1802 denotes an optical axis of a camera 1801, and 1803 denotes the field of view S of the camera. The angle between the optical axis and a straight line passing along an edge of the field of view is defined as a half field angle ω 1804. In a case where the angle between the line-of-sight directional vector and the normal vector of the lens cover face through which the line-of-sight directional vector passes is small, the lens cover face through which the incident light passes is approximately perpendicular to the directional vector of the incident light, and thus attenuation of the incident light caused by the lens cover is preferably small. For a lens cover covering two or more cameras, to evaluate the angle between the line-of-sight directional vector and the normal vector of the lens cover face as a whole of the lens cover, a calculation is performed to determine an inner product between a unit line-of-sight vector given by a unit vector of a line-of-sight directional vector and a unit normal vector given by a unit vector of a normal vector of a lens cover surface through which the line-of-sight directional vector passes, for a field of view S about the lens position for each camera. The evaluation value J that evaluates the magnitude of the angle between the two vectors described above is given by equation (5).

$$J = \frac{1}{NS}\sum_{i=1}^{N}\int_{S}(\vec{n}\cdot\vec{m}_i)dS \tag{5}$$

In equation (5), N is the number of cameras, and i is a camera index, $\vec{m}_i$ is a unit line-of-sight vector, $\vec{n}$ is the unit normal vector of the lens cover at a point through which the line-of-sight vector passes.

Figure 19:
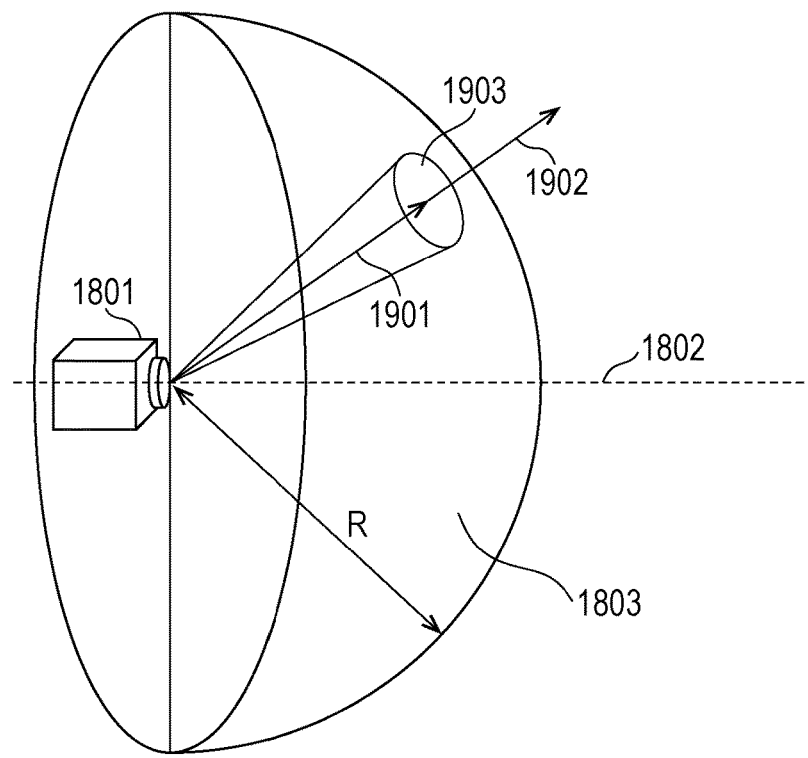
FIG. 19 is a conceptual diagram illustrating an evaluation value.

This evaluation value J corresponds to the average cosine of the angle between the two vectors described above. That is, the evaluation value J takes a maximum value of 1 when the angle between the two vectors described above is 0. For example, in a case where in one camera with a half field angle of 90°, a lens cover with a hemisphere face whose center is coincident with the center of the camera, the evaluation value J is obtained according to equation (5) as described below with reference to FIG. 19. In FIG. 19, the same constituent elements as those in FIG. 18 are denoted by the same reference signs used in FIG. 18, and a further description thereof is omitted. A line-of-sight vector of a camera is denoted by 1901, a small field of view through which the line-of-sight vector passes is denoted by 1902, and a unit normal vector of the small field of view is denoted by 1903. In equation (5), a depth value in a surface integral area is arbitrary, and thus a hemisphere face R is employed. The normal vector of the spherical surface passes through the center of this spherical surface, and thus the lens cover and the line-of-sight vector are perpendicular to each other. Thus, the inner product in equation (5), that is, $$\vec{mi} \text{ and } \vec{n}$$

is always equal to 1. Therefore, the evaluation value J according to equation (5) takes a maximum value equal to 1.

Figure 20A:
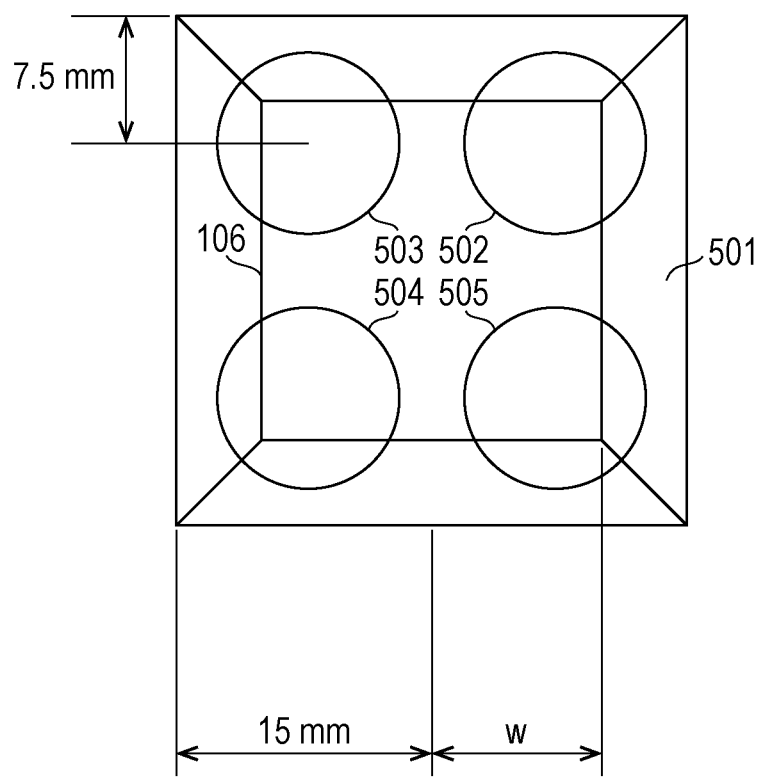
FIG. 20A is a plan view illustrating a positional relationship between a wide-angle camera and a lens cover.
Figure 20B:
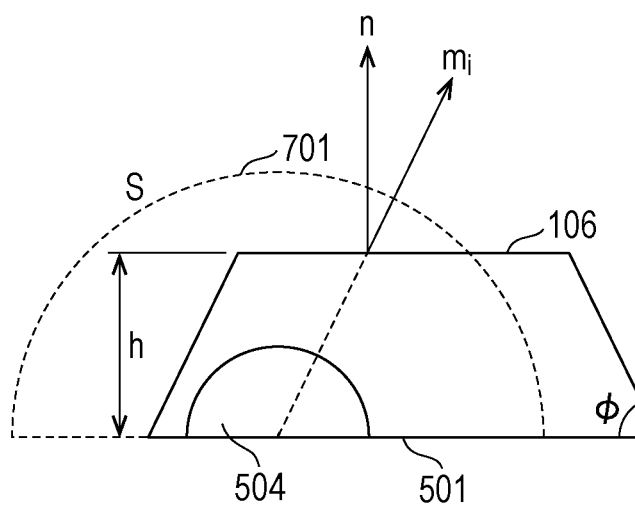
FIG. 20B is a side view illustrating a positional relationship between a wide-angle camera and a lens cover.
Figure 21:
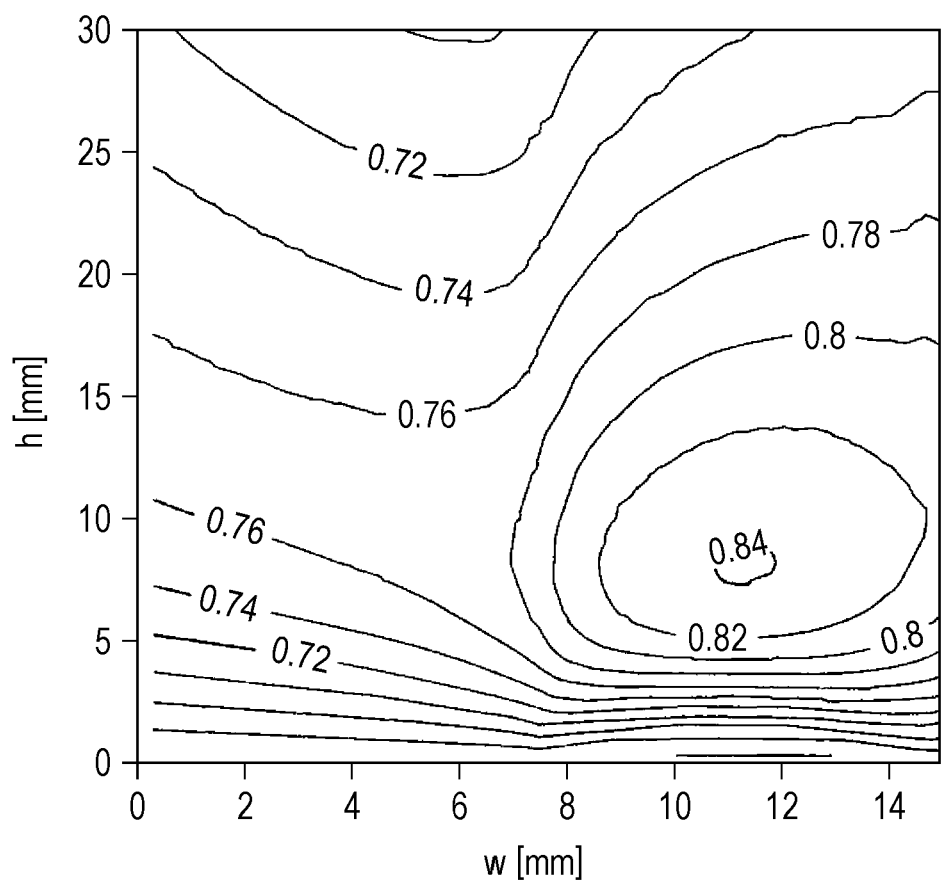
FIG. 21 is a contour diagram in terms of an evaluation value.

In FIG. 20A and FIG. 20B, it is assumed by way of example that four cameras similar to those in Embodiment 1 are used. In FIG. 20A and FIG. 20B, the same constituent elements as those in Embodiment 1 are denoted by the same reference signs used in FIG. 2A and FIG. 2B, and a further description thereof is omitted. A field of view at the center of the lens position according to equation (5) is denoted by 701, where it is assumed that the field of view of the camera is defined by a hemisphere (within 90° from the optical axis), w is one-half the length of a side of the upper face, and φ denotes an angle between a side and a bottom face of a frustum. Here let it be assumed by way of example that the one side of the bottom face of the lens cover is 30 mm long, and the center of the lens is located 7.5 mm apart from the side of the bottom face. In this configuration, w and h are determined which result in a maximum value of the evaluation value J according to equation (7). It is assumed that w and h are limited such that $0 < w \le 15$ mm and $0 < h \le 30$ mm because of the structural restriction of the lens cover. It is difficult to determine a solution by analytical calculation, and thus line-of-sight vectors are produced at equal angle intervals in a spherical coordinate system, and a solution is determined numerically. As an example of an actual numerical solution for angle resolution of 0.36°, 0.841 is obtained as the maximum value J, and 32.7° is obtained as the average angle between the line-of-sight vector and the normal vector of the lens cover surface through which the line-of-sight vector passes. In this state, w is 11.37 mm, h is 8.11 mm, and φ is 65.9° (FIG. 21). Note that when φ is 60°, the evaluation value J is about 0.7. Thus, the lens cover having the above-described shape for which φ is 65.9° is capable of reducing the influence of incident light attenuation caused by the lens cover more than is capable when φ is 60°.

Now, a description is given below as to a difference between a case where only one lens is provided and it is located at the center of a base and a case where a compound-eye structure is employed. In the former case, in view of symmetry, the evaluation value J is maximized in a trapezoid obtained as one-half of a regular hexagon as seen from a side, and φ is 60°. In contrast, in the latter case in which the there is no lens located in the center of the lens cover, the evaluation value J has a maximum value when φ is 65.9° which is greater than 60°. Therefore, the maximum value of the evaluation value J obtained in the case where there is only one lens and it is located at the center of the base is an example of a threshold value indicating that the lens cover is further closer to a position perpendicular to the incident light according to Embodiment 3.

As described above, the angle of light incident on the lens cover can be evaluated by the evaluation value J, and it is possible to reduce the influence of the incident light attenuation caused by the lens cover by determining the lens cover shape so as to increase the evaluation value.

EMBODIMENT 4

Lens Cover with a low Height is Disposed Within the Inside of a Hemispherical-face lens Cover In moving objects such as a vehicle or a drone, a protrusion of a lens cover can cause a collision to occur. Therefore, it is preferable that the height of the lens cover is small. In view of the above, a lens cover may be disposed inside a hemispherical-face lens cover with a radius equal to a radius of a circle circumscribed about a base.

Figure 22A:
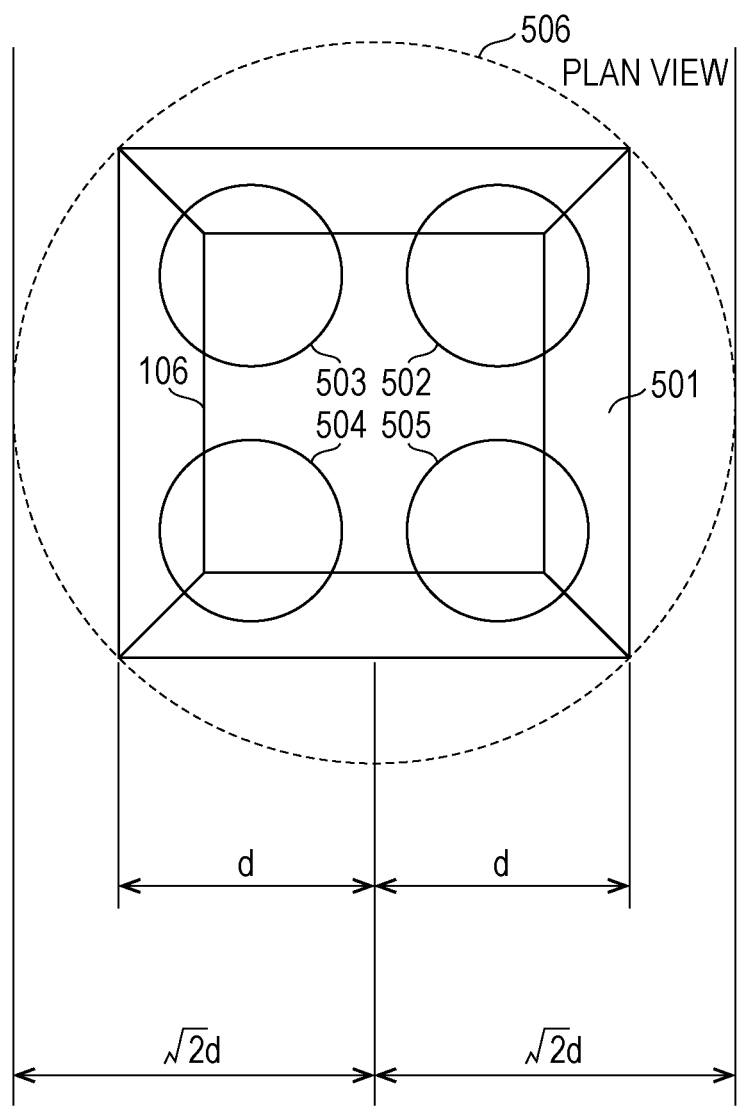
FIG. 22A is a plan view illustrating a positional relationship between a wide-angle camera and a lens cover.
Figure 22B:
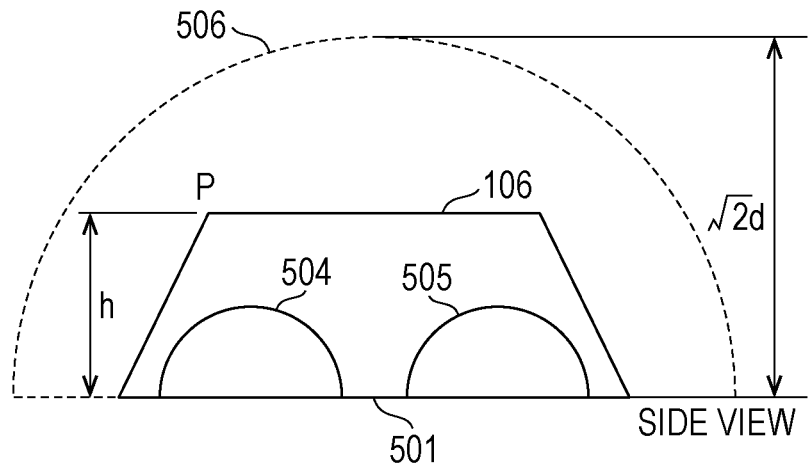
FIG. 22B is a side view illustrating a positional relationship between a wide-angle camera and a lens cover.

Referring to FIG. 22A and FIG. 22B, an example is described below in which it is assumed by way of example that four cameras similar to those in Embodiment 1 are used. In FIG. 22A and FIG. 22B, the same constituent elements as those in Embodiment 1 are denoted by the same symbols used in FIG. 2A and FIG. 2B, and a further description thereof is omitted. P denotes a vertex of an upper face of a lens cover (note that there are four vertices at symmetrical locations, and one vertex is taken as a representative example). When the lens cover is disposed such that P is located in the inside of a hemisphere face 506, the height of the lens cover is lower than the height of the hemispherical face lens cover.

In this case, the lens cover is included inside a sphere with a radius equal to a radius of a circle circumscribed about a bottom face (an upper surface of a base 501) on which a first wide-angle camera (a first camera) 102 and a second wide-angle camera (a second camera) 103 are disposed.

Thus, it is possible to reduce the height of the lens cover thereby reducing the probability of collision.

EMBODIMENT 5

Rounded Corners

In moving objects such as a vehicle or a drone, it is preferable that there is no sharp corners from the point of view of safety. From this point of view, ridgelines and regions near the ridgelines of a lens cover are replaced by curved surfaces thereby achieving a lens cover including no sharp corners, which ensures safety.

Figure 23:
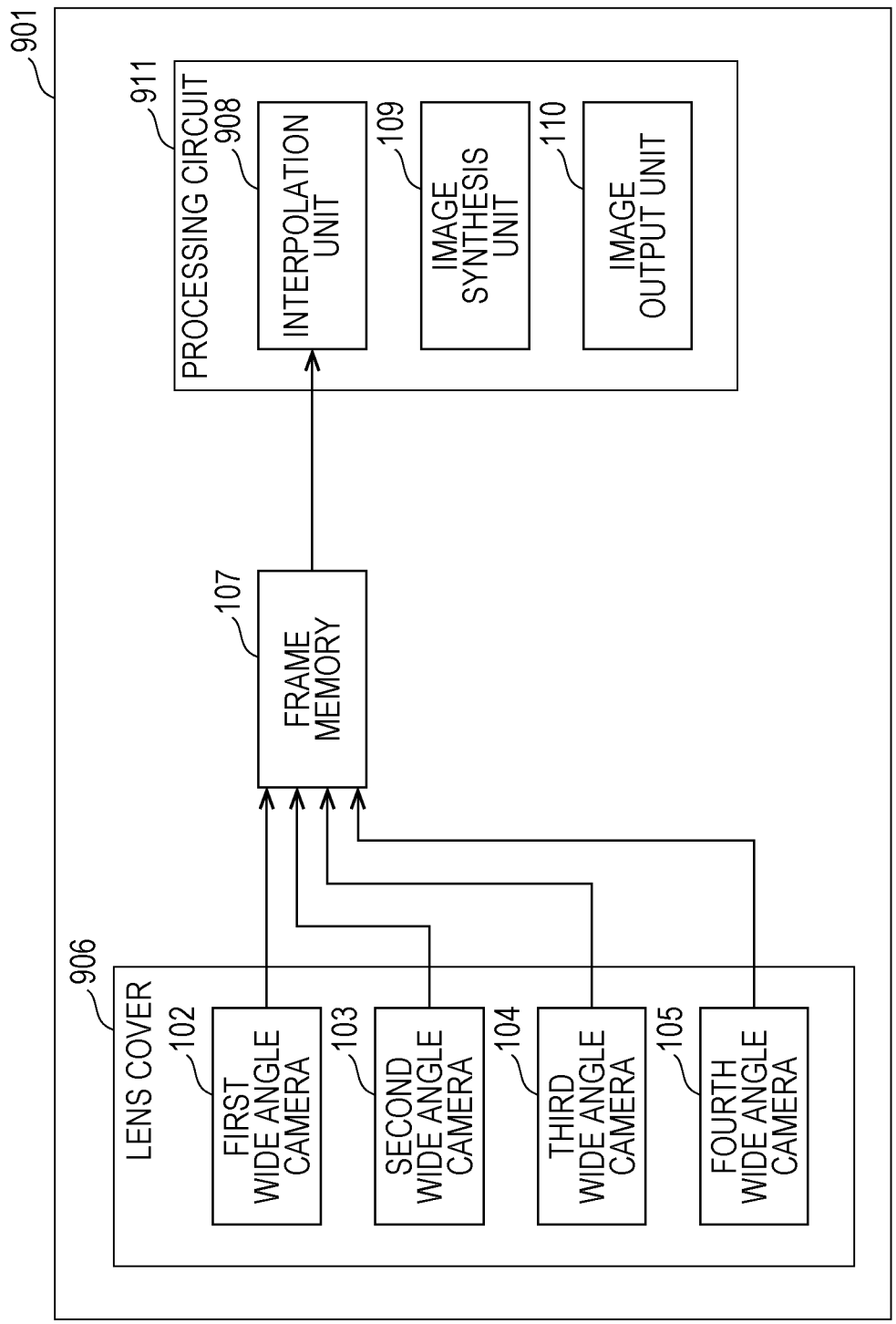
FIG. 23 is a block diagram illustrating a configuration of an image capturing apparatus according to Embodiment 5.

FIG. 23 is a block diagram illustrating an image capturing apparatus 901 according to Embodiment 5. In the following description, for simplicity, it is assumed by way of example that four wide-angle cameras similar to those according to Embodiment 1 are used.

As shown in FIG. 23, the image capturing apparatus 901 according to Embodiment 5 has a configuration obtained by modifying the image capturing apparatus 101 according to Embodiment 1 (see FIG. 1) such that the lens cover 106 is replaced by a lens cover 906 and the interpolation unit 108 is replaced by an interpolation unit 908. The lens cover 906 is modified from the lens cover 106 such that ridgelines and regions near the ridgelines are replaced by curved surfaces. This lens cover 106 is described below.

Figure 24:
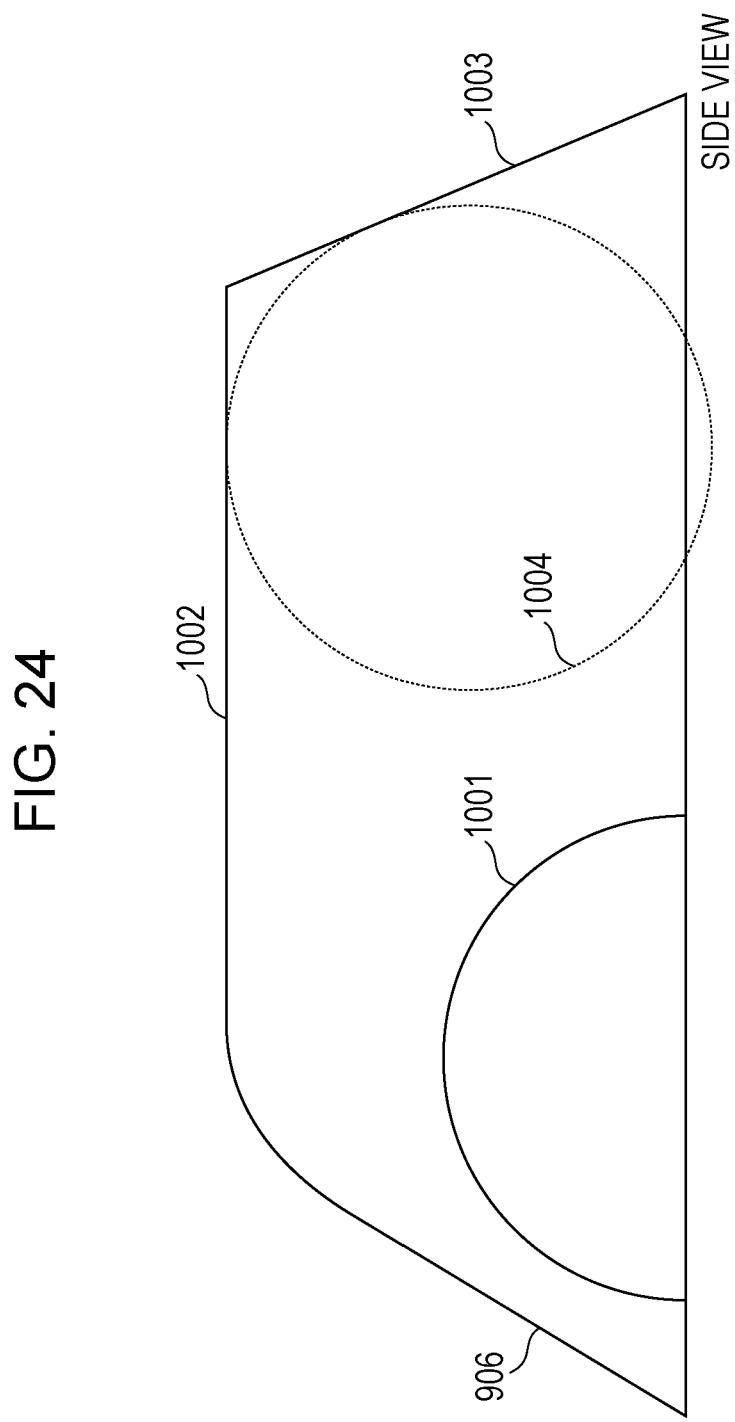
FIG. 24 is a side view of a cover.

FIG. 24 is a side view of the lens cover 906 which is a lens cover obtained by replacing ridgelines and regions near the ridgeline of a lens cover by curved surfaces. 1001 denotes a lens, and 1002 denotes a lens cover surface referred to as an upper surface parallel to a bottom face. Note that in FIG. 24, the plate thickness of the lens cover is neglected. The lens cover surface can be regarded as an outer surface of the lens cover. The inner surface of the lens cover may be designed in a similar manner. 1003 denotes a lens cover surface connected to the bottom face and referred to as a side. 1004 denotes a cylinder in contact with the upper surface 1002 and the side 1003. This cylinder 1004 is represented as a circle in the side view shown in FIG. 24. To replace ridgelines and regions near the ridgelines of a lens cover by curved surfaces, a curved surface is disposed such that the curved surface is in contact with the two plane parts 1002 and 1003 as shown in FIG. 24, and the ridgelines and the regions near the ridgelines in the frustum-shape lens cover or the twisted frustum-shape lens cover according to any of Embodiments 1 to 4 are replaced by the above-described curved surface. The size of the curved surface can be represented by a radius of curvature. It is desirable to meet safety standards in in-vehicle applications. To this end, for example, the radius of curvature is set to be greater than or equal to 2.5 mm according to the notification of details of standards for safety of the road transport vehicle (Jun. 18, 2016) exhibit 20 (technical standards for exteriors). The curvature may be determined based on the base size. For example, the curvature may be set to be 1% of the length of one side of the base.

Note that the curved surface described above is not limited to the cylinder 1004. Plane areas of the lens cover other than the ridgelines and the regions near the ridgelines may be determined in a similar manner as in Embodiments 1 to 4, and thus a further description thereof is omitted.

The interpolation unit 908 interpolates pixel values on an image in areas influenced by distortion of light passing near ridgelines caused by the curved surface of the lens cover 906. This interpolation is described below with reference to FIG. 25.

Figure 25:
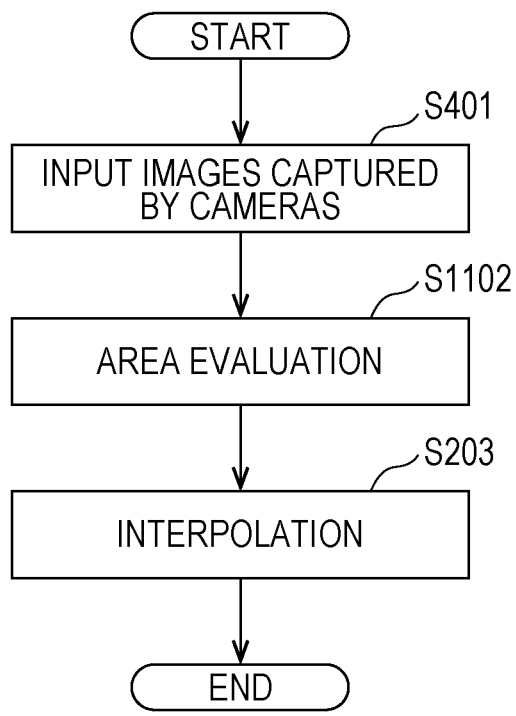
FIG. 25 is a flowchart illustrating an operation of an interpolation unit.

FIG. 25 is a flowchart illustrating an operation of the interpolation unit 908.

As shown in FIG. 25, the operation performed by the interpolation unit 908 is different from the operation performed by the interpolation unit 108 according to Embodiment 1 (see FIG. 4) in that the process in step S402 is replaced by a process in step S1102. This process in step S1102 is described below.

The interpolation unit 908 determines a shielded area on an image influenced by distortion of light caused by the curved surface of the lens cover (step S1102). This determination is performed by one of three methods described below or by a combination thereof. In a first method, the determination is made, in a similar manner as in Embodiments 1 to 4, by determining whether another camera has an area that matches a neighboring region of pixel of interest of a camera of interest. In a second method, the determination is made by determining whether incident light passes through the curved surface for each pixel on an image based on design values of the lens cover. In a third method, the determination is made by determining whether the location is within a given range, as counted by the number of pixels, from an edge of a shield area that occurs owing to the lens cover.

As described above, it is possible to achieve a small-size and wide-angle image capturing apparatus using a high-safety lens cover having no sharp corners.

The present disclosure has been described above with reference to the image capturing apparatus according to one or more embodiments. However, the present disclosure is not limited to those embodiments. It will be apparent to those skilled in the art that many various modifications may be applicable to the embodiments without departing from the spirit and scope of the present disclosure. Furthermore, constituent elements of different embodiments may be combined. In this case, any resultant combination also falls within the scope of the present disclosure.

The image capturing apparatus and the image capturing method disclosed above are useful in moving objects such as a drone or a vehicle for use in monitoring surroundings or for drive assist.

What is claimed is:

1. An image capturing apparatus comprising:
   a first camera that has a first lens and captures a first image;
   a second camera that has a second lens and captures a second image;
   a lens cover that includes parts transparent to light and ridgelines, the lens cover covering the first camera and the second camera, the parts including an upper part and adjacent parts, each of the adjacent parts contacting the upper part, the ridgelines being formed between surfaces of the adjacent parts and a surface of the upper part, the first lens overlapping both the upper part and at least one of the adjacent parts in the plan view and the second lens overlapping both the upper part and at least one of the adjacent parts in the plan view; and
   a processing circuit that (i) identifies a pixel located in an area influenced by distortion in the first image, and (ii) generates an output image using the first image and interpolation pixel information for interpolating a pixel value of the identified pixel, wherein
   each of the ridgelines is at a location twisted with respect to a base line extending between a first center of the first lens and a second center of the second lens,
   the upper part opposes a base on which the first camera and the second camera are disposed, and
   the processing circuit identifies the pixel based on the first image and the second image.

2. The image capturing apparatus according to claim 1, further comprising
   a storage unit that stores area identification information for identifying the area,
   wherein the processing circuit identifies the pixel based on the area identification information.

3. The image capturing apparatus according to claim 1, wherein the processing circuit acquires, as the interpolation pixel information, a pixel value of a neighboring pixel located within a predetermined range of a distance from the area.

4. The image capturing apparatus according to claim 1, further comprising a third camera that captures a third image,
   wherein the processing circuit acquires, as the interpolation pixel information, information on a pixel value of a pixel corresponding to the area by using the second image and the third image.

5. The image capturing apparatus according to claim 1, wherein the lens cover further covers an upper surface of the base, and is included within a sphere with a radius equal to a radius of a circle circumscribed about the upper surface.

6. The image capturing apparatus according to claim 1, wherein one of the ridgelines and a neighboring region of the one of the ridgelines are replaced by a curved surface.

7. The image capturing apparatus according to claim 1, wherein
the lens cover further covers an upper surface of the base, and
an outer surface of the upper part, an inner surface of the upper part, and the upper surface are parallel to each other.

8. The image capturing apparatus according to claim 1, wherein
the lens cover further covers an upper surface of the base,
an outer surface of the upper part and the upper surface are similar in shape to each other, and
the outer surface of the upper part is smaller in size than the upper surface.

9. An image capturing apparatus comprising:
a first camera that has a first lens and captures a first image;
a second camera that has a second lens and captures a second image;
a lens cover that includes parts transparent to light and ridgelines, the lens cover covering the first camera and the second camera, the parts including an upper part and adjacent parts, each of the adjacent parts contacting the upper part, the ridgelines being formed between surfaces of the adjacent parts and a surface of the upper part, the first lens overlapping both the upper part and at least one of the adjacent parts in the plan view and the second lens overlapping both the upper part and at least one of the adjacent parts in the plan view; and
a processing circuit that (i) identifies a pixel located in an area influenced by distortion in the first image, and (ii) generates an output image using the first image and interpolation pixel information for interpolating a pixel value of the identified pixel, wherein
each of the ridgelines is at a location twisted with respect to a base line extending between a first center of the first lens and a second center of the second lens,
the upper part opposes a base on which the first camera and the second camera are disposed, and
the lens cover further covers an upper surface of the base, and is included within a sphere with a radius equal to a radius of a circle circumscribed about the upper surface.

10. The image capturing apparatus according to claim 9, wherein one of the ridgelines and a neighboring region of the one of the ridgelines are replaced by a curved surface.

11. The image capturing apparatus according to claim 9, wherein
an outer surface of the upper part, an inner surface of the upper part, and the upper surface are parallel to each other.

12. The image capturing apparatus according to claim 9, wherein
an outer surface of the upper part and the upper surface are similar in shape to each other, and
the outer surface of the upper part is smaller in size than the upper surface.

13. An image capturing apparatus comprising:
a first camera that has a first lens and captures a first image;
a second camera that has a second lens and captures a second image;
a lens cover that includes parts transparent to light and ridgelines, the lens cover covering the first camera and the second camera, the parts including an upper part and adjacent parts, each of the adjacent parts contacting the upper part, the ridgelines being formed between surfaces of the adjacent parts and a surface of the upper part, the first lens overlapping both the upper part and at least one of the adjacent parts in the plan view and the second lens overlapping both the upper part and at least one of the adjacent arts in the plan view; and
a processing circuit that (i) identifies a pixel located in an area influenced by distortion in the first image, and (ii) generates an output image using the first image and interpolation pixel information for interpolating a pixel value of the identified pixel, wherein
an external shape of the lens cover is formed such that when N denotes a number of cameras, S denotes a field of view, i denotes an index indicating the first camera or the second camera, $$\vec{m_i}$$

denotes a unit line-of-sight vector of a camera i, $$\vec{n}$$

denotes a unit normal vector of the lens cover at a point through which the line-of-sight vector of the camera i passes, and $$J = \frac{1}{NS}\sum_{i=1}^{N}\int_{S}(\vec{n}\cdot\vec{m_i})dS$$

defines an evaluation value J, the evaluation value J is greater than 0.7 to reduce an influence by a region near the ridgelines of the lens cover.

14. An image capturing method comprising:
controlling a first camera having a first lens to capture a first image;
controlling a second camera having a second lens to capture a second image;
identifying a pixel located in an area influenced by distortion, in the first image; and
generating an output image using the first image and interpolation pixel information for interpolating a pixel value of the identified pixel, wherein
the first camera and the second camera are covered with a lens cover including transparent parts and ridgelines, the transparent parts including an upper part and adjacent parts, each of the adjacent parts contacting the upper part, the ridgelines being formed between surfaces of the adjacent parts and a surface of the upper part, the first lens overlapping both the upper part and at least one of the adjacent parts in the plan view and the second lens overlapping both the upper part and at least one of the adjacent parts in the plan view
each of the ridgelines is at a location twisted with respect to a base line extending between a first center of the first lens and a second center of the second lens,
the upper part opposes a base on which the first camera and the second camera are disposed, and
the identifying of the pixel is performed based on the first image and the second image.

* * * * *